(12) United States Patent
Kao et al.

(10) Patent No.: US 9,954,337 B2
(45) Date of Patent: Apr. 24, 2018

(54) ELECTRICAL PLUGS WITH INTEGRATED STRAIN RELIEF AND METHOD OF MANUFACTURE

(71) Applicant: STANDARD CABLE USA, INC., Rancho Santa Margarita, CA (US)

(72) Inventors: Selvin Kao, Ladera Ranch, CA (US); Philip Carlo J. DeGuzman, Fontana, CA (US); Sze-Han Liao, Irvine, CA (US)

(73) Assignee: Selvin Kao, Ladera Ranch, CA (US)

(*) Notice: Subject to any disclaimer, the term of this patent is extended or adjusted under 35 U.S.C. 154(b) by 648 days.

(21) Appl. No.: 14/579,643

(22) Filed: Dec. 22, 2014

(65) Prior Publication Data

US 2016/0181755 A1 Jun. 23, 2016

(51) Int. Cl.
| H01R 13/62 | (2006.01) |
| H01R 43/24 | (2006.01) |
| B29C 45/14 | (2006.01) |
| H01R 13/58 | (2006.01) |
| B29L 31/36 | (2006.01) |
| H01R 24/28 | (2011.01) |

(52) U.S. Cl.
CPC ....... *H01R 43/24* (2013.01); *B29C 45/14639* (2013.01); *H01R 13/5845* (2013.01); *B29L 2031/36* (2013.01); *H01R 13/5804* (2013.01); *H01R 24/28* (2013.01)

(58) Field of Classification Search
CPC ................ H01R 43/24; H01R 13/5845; B29C 45/14639
See application file for complete search history.

(56) References Cited

U.S. PATENT DOCUMENTS

| 2,756,402 | A |   | 7/1956  | Haworth et al. |
| 3,315,211 | A | * | 4/1967  | Weeks, Jr. ............. H01R 24/28 |
|           |   |   |         | 439/599 |
| 3,986,765 | A |   | 10/1976 | Shaffer et al. |
| 4,033,535 | A |   | 7/1977  | Moran |
| 4,108,527 | A |   | 8/1978  | Douty et al. |
| 4,216,930 | A |   | 8/1980  | Rossler et al. |
| 4,289,923 | A |   | 9/1981  | Ebert |
| 4,310,213 | A |   | 1/1982  | Fetterolf et al. |

(Continued)

OTHER PUBLICATIONS

International Search Report and Written Opinion dated Mar. 7, 2016 from corresponding International PCT Application No. PCT/US15/66313, 17 pages.

(Continued)

*Primary Examiner* — Galen H Hauth
(74) *Attorney, Agent, or Firm* — Innovation Capital Law Group, LLP; Vic Lin

(57) ABSTRACT

Overmolded electrical plugs with integrated strain relief are disclosed. The strain relief may have multiple protrusions extending though the overmolded housing which are visible to users. The strain relief may employ a ratcheting mechanism which permanently secures the strain relief on the electrical power cord. The strain relief may be partially assembled in a pre-lock configuration on the electrical power cord where the strain relief may be positioned on the power cord, and then be further pressed to a locked configuration in which the is securely attached to the power cord. The strain relief is self-aligned on the electrical plug during an assembly process.

19 Claims, 36 Drawing Sheets

(56) References Cited

U.S. PATENT DOCUMENTS

| | | | |
|---|---|---|---|
| 4,449,776 A | 5/1984 | Carmo et al. | |
| 4,493,467 A | 1/1985 | Borja | |
| 4,493,523 A | 1/1985 | Leong et al. | |
| 4,568,047 A | 2/1986 | Matsui | |
| 4,611,878 A | 9/1986 | Hall et al. | |
| 4,640,984 A | 2/1987 | Kalbfeld | |
| 4,835,342 A | 5/1989 | Guginsky | |
| 4,842,550 A | 6/1989 | Fry et al. | |
| 4,897,041 A | 1/1990 | Heiney et al. | |
| 4,931,023 A | 6/1990 | Browne | |
| 5,188,542 A | 2/1993 | Ballman | |
| 5,211,576 A * | 5/1993 | Tonkiss | H01R 13/59 439/462 |
| 5,243,139 A | 9/1993 | Law | |
| 5,308,259 A | 5/1994 | Liao | |
| 5,380,301 A * | 1/1995 | Prichard | A61M 25/0014 604/533 |
| 5,445,538 A | 8/1995 | Rodrigues et al. | |
| 5,591,046 A | 1/1997 | Klein et al. | |
| 5,609,499 A | 3/1997 | Tan et al. | |
| 5,785,547 A | 7/1998 | Cross et al. | |
| 5,831,815 A | 11/1998 | Miller et al. | |
| 5,926,952 A * | 7/1999 | Ito | B29C 45/14065 264/264 |
| 6,007,370 A | 12/1999 | Langridge | |
| 6,017,243 A | 1/2000 | Castaldo | |
| 6,123,573 A | 9/2000 | Savicki | |
| 6,419,520 B2 | 7/2002 | Miersch et al. | |
| 6,478,609 B1 | 11/2002 | Davis et al. | |
| 7,195,514 B2 | 3/2007 | Wakefield et al. | |
| 7,229,309 B2 | 6/2007 | Carroll et al. | |
| 7,484,993 B2 | 2/2009 | Amidon et al. | |
| 7,500,643 B2 | 3/2009 | Leone et al. | |
| 7,727,021 B2 | 6/2010 | Haruna et al. | |
| 8,342,877 B2 | 1/2013 | De Bruijn et al. | |
| 8,491,328 B2 | 7/2013 | Mulfinger et al. | |
| 8,556,649 B2 | 10/2013 | Nolting et al. | |
| 8,597,053 B2 | 12/2013 | Oh | |
| 8,734,178 B2 | 5/2014 | Inagaki et al. | |
| 8,777,167 B2 | 7/2014 | Su et al. | |
| 8,807,489 B2 | 8/2014 | Su et al. | |
| 9,136,658 B2 | 9/2015 | Chang et al. | |
| 2007/0111577 A1 | 5/2007 | Howard | |

OTHER PUBLICATIONS

Office Action dated Jan. 12, 2016 from related U.S. Appl. No. 14/579,626, 13 pages.

Office Action dated Jan. 12, 2016 from related U.S. Appl. No. 14/579,634, 14 pages.

\* cited by examiner

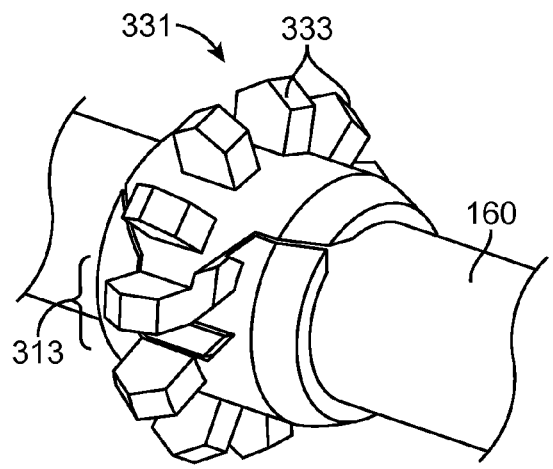
FIG. 13
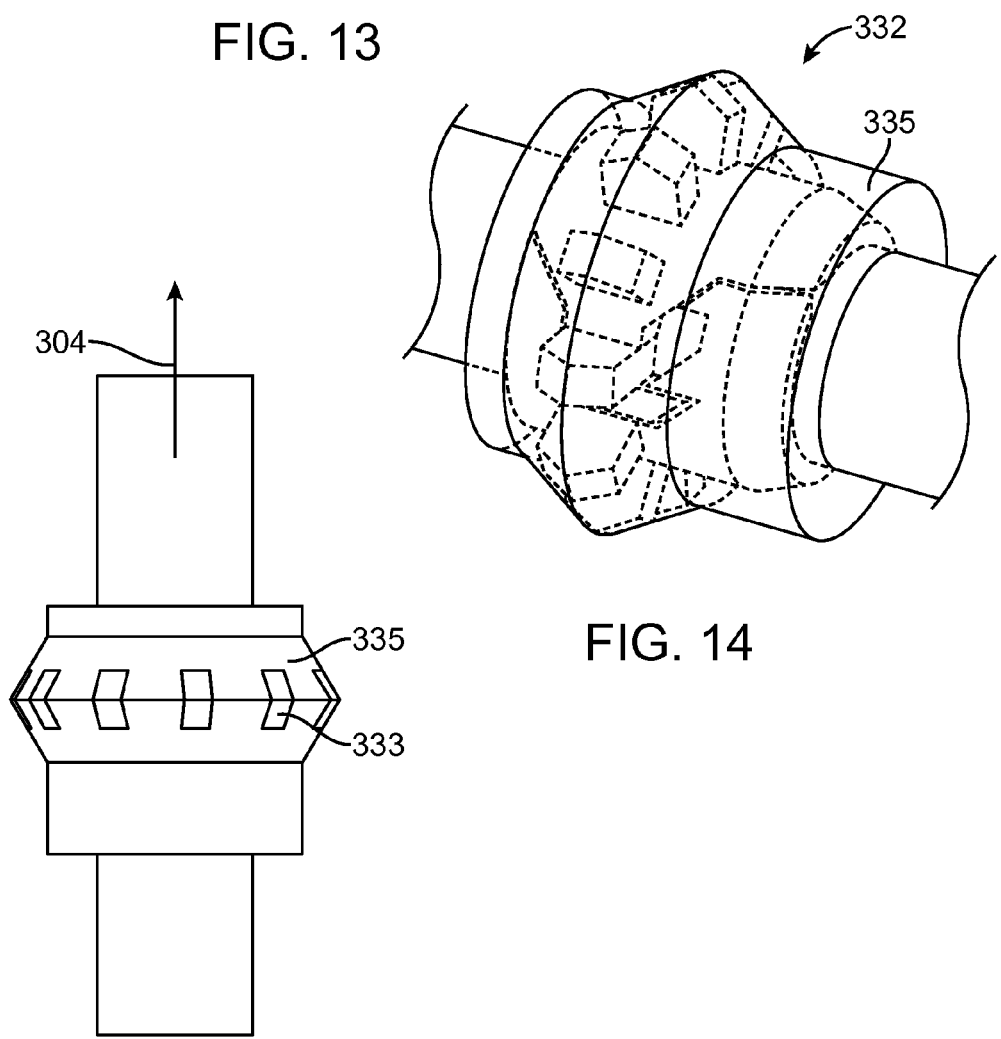
FIG. 14
FIG. 15

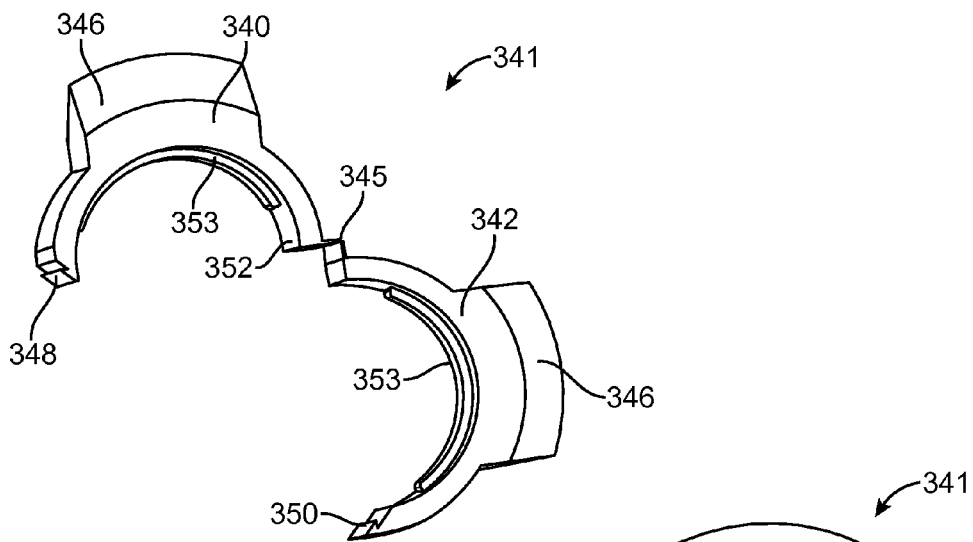
FIG. 16
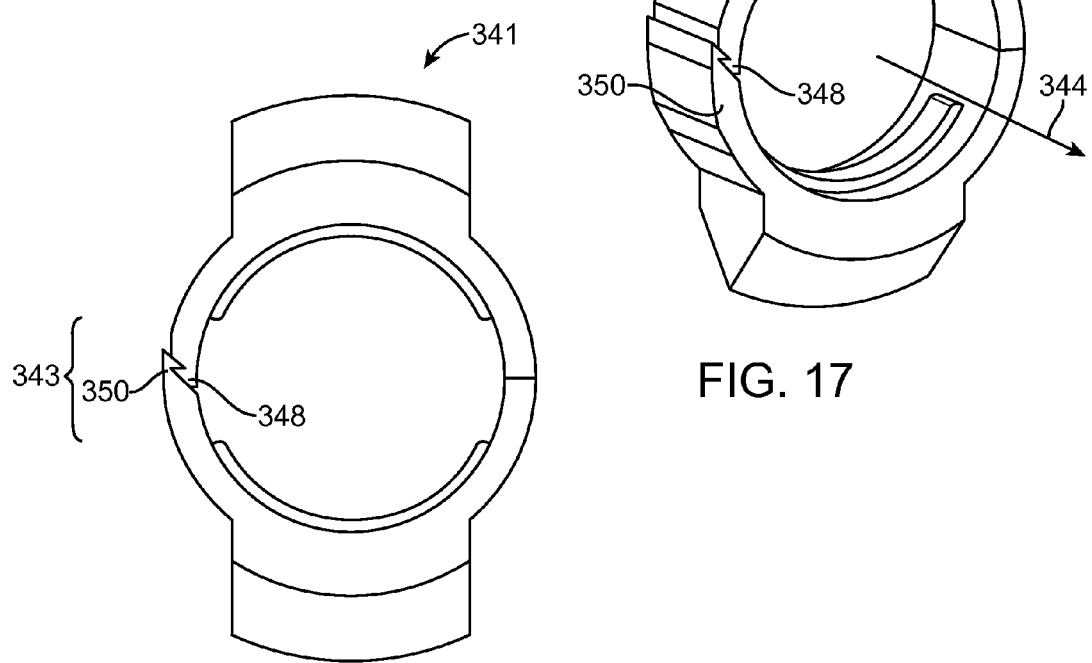
FIG. 17
FIG. 18

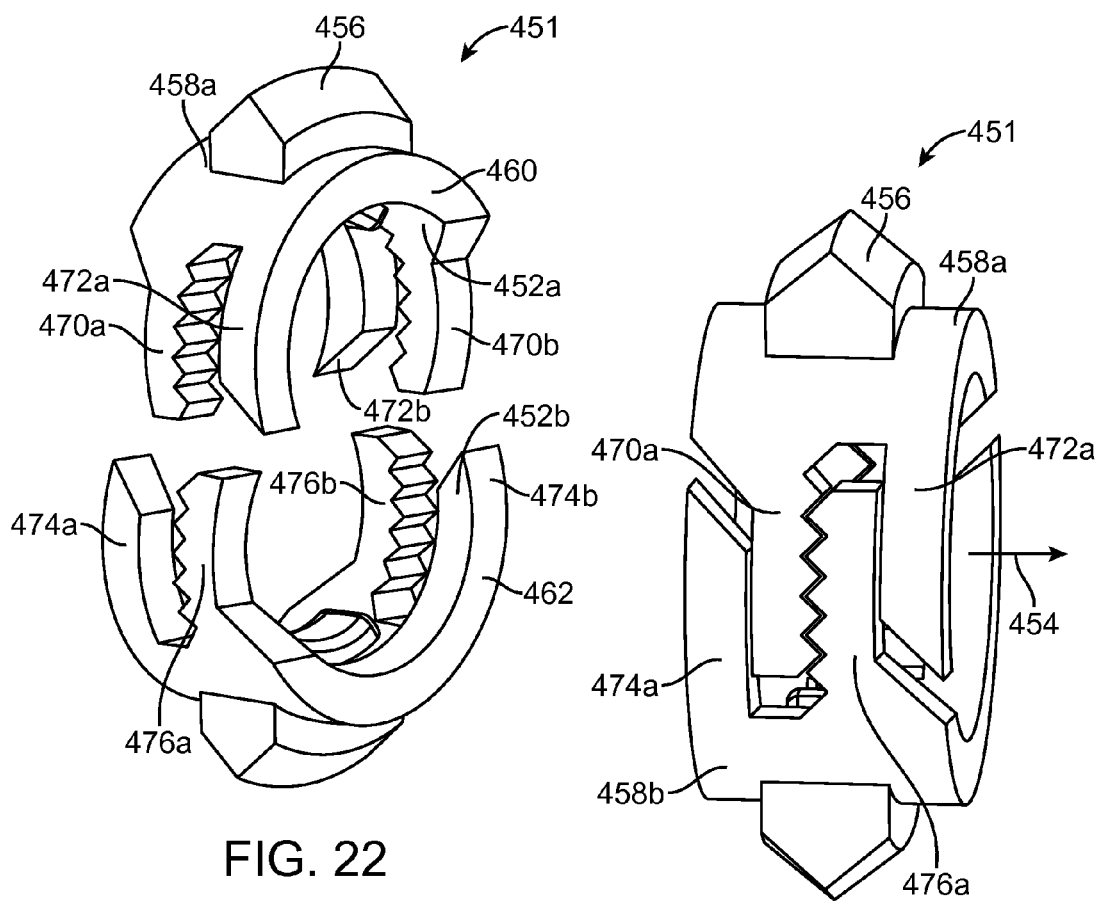
FIG. 22
FIG. 23
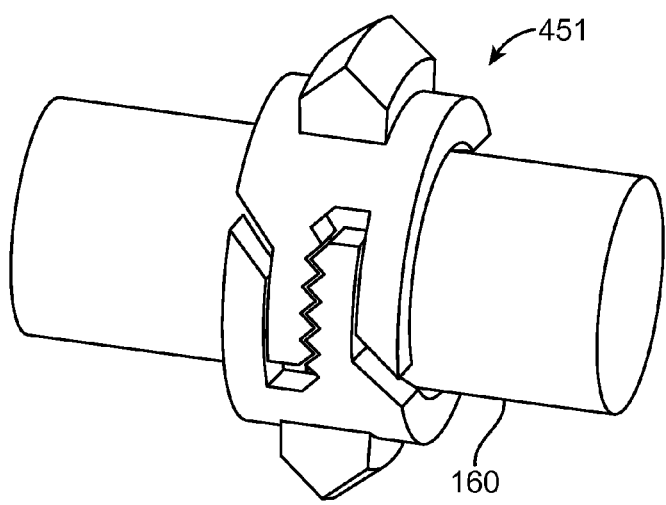
FIG. 24

ELECTRICAL PLUGS WITH INTEGRATED STRAIN RELIEF AND METHOD OF MANUFACTURE

BACKGROUND OF THE INVENTION

1. Field of the Invention

The present invention relates in general to electrical plugs and a method of manufacture thereof. More particularly, the invention is directed to electrical plugs having integrated strain relief and the method of manufacture thereof.

2. Description of the Related Art

Electrical plugs are commonly used in many commercial and residential applications. Many of the electrical plugs employ strain relief to prevent accidental separation of the plugs from the wires when the plugs are removed from sockets. However, many electrical plugs do not provide a visual indication of the strain relief mechanism. As such, users may not readily identify electrical plugs having integrated strain relief for heavy-duty applications.

Accordingly, a need exists to provide a visual indication of strain relief.

SUMMARY OF THE INVENTION

In the first aspect, a strain relief assembly for an electrical power cord is disclosed. The strain relief assembly comprises a strain relief having an inner clamping surface and an outer surface, the inner clamping surface configured to form a passageway for surrounding and securing an electrical power cord, the outer surface having a plurality of protrusions extending radially away from the passageway. The strain relief assembly further comprises an overmold housing partially surrounding the strain relief, wherein the protrusions of the strain relief extends to or beyond the outer surface of the overmold housing.

In a first preferred embodiment, the outer surfaces of the protrusions are not covered by the overmold housing. The protrusions are preferably contoured to enable lateral positioning on an electrical power cord during the overmold process. The strain relief preferably has a pre-locked configuration and a locked configuration, wherein the strain relief in the pre-locked configuration is able to move laterally about an electrical power cord, the strain relief in the locked configuration is secured to the electrical power cord. The strain relief preferably comprises a first and a second section. The first section preferably comprises a first half-shell having one or more first set of protrusions, the first half-shell having a plurality of posts extending from the first half-shell. The second section preferably comprises a second half-shell having one or more second set of protrusions, the second section having a plurality of holes, each of the holes formed to receive and secure the corresponding post during an assembly process.

The first section preferably has one or more first set of protrusions and the first section has two pawls extending away from the first section. The second section preferably comprises a second set of protrusions, the second section having two racks of teeth, wherein each rack of teeth are configured to receive the corresponding pawl from the first section during an assembly process. The first section preferably has a first set of protrusions, the first section having a first and a second rack extending away from the first section. The second section preferably has a second set of protrusions, the second section having a third and a fourth rack extending away from the second section, where the third and fourth racks are configured to receive the first and second racks during an assembly process.

The first section preferably comprises a first generally cylindrical section having a first set of protrusions and the first generally cylindrical section has two pawls extending away from the first generally cylindrical section. The second section preferably comprises a second generally cylindrical section having one or more second set of protrusions, the second generally cylindrical section having two sets of teeth, wherein each set of teeth are configured to receive the corresponding pawl from the first generally cylindrical section during an assembly process. The strain relief preferably comprises one-piece body having a first and a second section, the first section hingably connected to the second section, the first section configured to rotate relative to the second section about an axis parallel with the length of the electrical cord.

In a second aspect, a strain relief assembly for an electrical power cord comprises an electrical power cord, and a strain relief having an inner clamping surface and an outer surface, the inner clamping surface surrounding and securing the electrical power cord, the outer surface having a plurality of protrusions extending radially away from the length of the electrical power cord. The strain relief assembly further comprises an overmold housing partially surrounding the strain relief, wherein the protrusions of the strain relief extends to or beyond the outer surface of the overmold housing.

In a second preferred embodiment, the outer surfaces of the protrusions are not covered by the overmold housing. The protrusions are preferably contoured to enable lateral positioning on an electrical power cord during the overmold process. The strain relief preferably has a pre-locked configuration and a locked configuration, wherein the strain relief in the pre-locked configuration is able to move laterally about an electrical power cord, the strain relief in the locked configuration is secured to the electrical power cord. The strain relief preferably comprises a first and a second section. The first section preferably comprises a first half-shell having one or more first set of protrusions, the first half-shell having a plurality of posts extending from the first half-shell. The second section preferably comprises a second half-shell having one or more second set of protrusions, the second section having a plurality of holes, each of the holes formed to receive and secure the corresponding post during an assembly process.

In a third aspect, a strain relief assembly for an electrical power cord is disclosed. The strain relief assembly comprises a strain relief having an inner clamping surface and an outer surface, the inner clamping surface configured to form a passageway for surrounding and securing an electrical power cord, the outer surface having a plurality of protrusions extending radially away from the passageway, the strain relief having a coupling member extending away from the strain relief and configured to connect with an electrical plug inner body. The strain relief assembly further comprises an overmold housing partially surrounding the strain relief, wherein the protrusions of the strain relief extends to or beyond the outer surface of the overmold housing.

In a third preferred embodiment, the outer surfaces of the protrusions are not covered by the overmold housing. The strain relief preferably has a pre-locked configuration and a locked configuration, wherein the strain relief in the pre-locked configuration is able to move laterally about an electrical power cord, the strain relief in the locked configuration is secured to the electrical power cord. The strain relief preferably comprises one-piece body having a first and a second section, the first section hingably connected to the second section, the first section configured to rotate relative to the second section about an axis parallel with the length of the electrical power cord.

In a fourth aspect, an electrical plug with integrated strain relief is disclosed. The electrical plug with integrated strain relief comprises an inner body assembly comprising a wire assembly comprising an electrical power cord and at least two electrical connectors, and an inner body securing and essentially surrounding the electrical connectors. The electrical plug with integrated strain relief further comprises a strain relief having an inner clamping surface and an outer surface, the inner clamping surface configured to form a passageway for surrounding and securing the electrical power cord, the outer surface having a plurality of protrusions extending radially away from the electrical power cord, and a coupling member coupling the strain relief to the inner body assembly. The electrical plug with integrated strain relief further comprises an overmolded outer housing partially encasing the inner body assembly and the strain relief, wherein the protrusions of the strain relief extend to the outer surface of the overmold housing.

In a fourth preferred embodiment, the coupling member is integral with the with the strain relief. The coupling member preferably connectably clips to the inner body assembly. The strain relief preferably has a pre-locked configuration and a locked configuration, wherein the strain relief in the pre-locked configuration is able to move laterally about the electrical power cord, the strain relief in the locked configuration is secured to the electrical power cord. The outer surfaces of the protrusions of the strain relief are preferably not covered by the overmold housing. The strain relief preferably comprises a first and a second section. The strain relief preferably comprises one-piece body having a first and a second section, the first section hingably connected to the second section, the first section configured to rotate relative to the second section about an axis parallel with the length of the electrical power cord. The inner body preferably further comprises one or more inner body protrusions projecting outward and away from the inner body, and the inner body protrusions are preferably flush with or extend beyond the overmolded outer housing. The inner body protrusions are preferably shaped to indicate an orientation.

In a fifth aspect, an electrical plug with integrated strain relief is disclosed. The plug comprises an inner body assembly comprising a wire assembly comprising an electrical power cord and at least two electrical connectors, and an inner body securing and essentially surrounding the electrical connectors. The plug further comprises a strain relief having an inner clamping surface and an outer surface, the inner clamping surface configured to form a passageway for surrounding and securing the electrical power cord, the outer surface having a plurality of protrusions extending radially away from the passageway. The plug further comprises an overmolded outer housing partially encasing the inner body assembly and the strain relief, the protrusions of the strain relief extending to the outer surface of the overmold housing, and overmolded outer housing physically couples the strain relief to the inner body assembly providing strain relief.

In a fifth preferred embodiment, the strain relief has a pre-lock configuration and a lock configuration, wherein the strain relief in the pre-lock is able to move laterally about an electrical power cord, the strain relief in the lock configuration is secured to the electrical power cord. The protrusions of the strain relief are preferably visible. The strain relief preferably comprises a first and a second section. The strain relief preferably comprises one-piece body having a first and a second section, the first section hingably connected to the second section, the first section configured to rotate relative to the second section about an axis parallel with the length of the electrical power cord. The first section preferably comprises a first half-shell having one or more first set of protrusions, the first half-shell having a plurality of posts extending from the first half-shell, and the second section comprises a second half-shell having one or more second set of protrusions, the second section having a plurality of holes, each of the holes formed to receive and secure the corresponding post during an assembly process.

The first section preferably comprises a first half-shell having one or more first set of protrusions, the first half-shell having two pawls extending away from the first half-shell, and the second section comprises a second half-shell having one or more second set of protrusions, the second section having two sets of teeth, wherein each set of teeth are configured to receive the corresponding pawl from the first half-shell during an assembly process. The first section preferably comprises a first half-shell having a first set of protrusions, the first half-shell having a first and a second rack extending away from the first half-shell. The second section preferably comprises a second half-shell having a second set of protrusions, the second section having a third and a fourth rack extending away from the second half-shell, wherein the third and fourth racks are configured to receive the first and second racks during an assembly process. The inner body preferably further comprises one or more inner body protrusions projecting outward and away from the inner body, and the inner body protrusions are flush with or extend beyond the overmolded outer housing. The inner body protrusions are preferably shaped to indicate an orientation.

In a sixth aspect, an electrical plug with integrated strain relief is disclosed. The plug comprises an inner body assembly comprising a wire assembly comprising an electrical power cord and at least two electrical connectors, and a one-piece inner body securing and essentially surrounding the electrical connectors. The one-piece inner body comprises a base having one or more latching mechanisms, a first cover hingably coupled to the base on a first side of the base, and a second cover hingably coupled to the base on a second side of the base, the second side of the base opposite that of the first side of the base. The plug further comprises a strain relief having an inner clamping surface and an outer surface, the inner clamping surface configured to form a passageway for surrounding and securing the electrical power cord, the outer surface having a plurality of protrusions extending radially away from the electrical power cord. The plug further comprises an overmolded outer housing partially encasing the inner body assembly and the strain relief, wherein the protrusions of the strain relief extends to the outer surface of the overmold housing.

In a seventh aspect, a method for manufacturing an overmolded electric plug with integrated strain relief is disclosed. The method comprises producing an inner body assembly comprising a wire assembly and an inner body, the wire assembly comprising an electrical power cord and electrical connectors, the inner body securing the electrical connectors, and placing a strain relief around the electrical power cord, the strain relief having plurality of protrusions extending radially away from the electrical power cord. The method further comprises producing an injection mold comprising a top mold block, a bottom mold block, and a socket mold block, the injection mold having a mold cavity shaped to correspond to the desired shape of the overmolded electric plug with integrated strain relief, the bottom mold block shaped to receive and detachably secure the inner body assembly and a strain relief, the socket mold block having socket connectors configured to receive the electrical connectors, the injection mold having a feeder injection port. The method further comprises coupling the electrical connectors to the socket connectors of the socket mold block, placing the inner body assembly and the strain relief into the bottom mold, pressing the top mold block onto the bottom mold block, injecting a molten insulating material into the injection mold through the feeder injection port, and removing the overmolded electric plug from the injection mold.

In a seventh preferred embodiment, the strain relief has an outer surface has a plurality of protrusions, and the mold cavity is shaped to receive the protrusions of the strain relief and form a seal surrounding the protrusions of the strain relief to prevent the molten insulating material from depositing on the outer surface of the protrusions of the strain relief. Placing a strain relief around the electrical power cord preferably comprises pre-locking the strain relief around the electrical power cord, wherein the strain relief in the pre-locked configuration is able to move laterally about the electrical power cord. Pressing the top mold block onto the bottom mold block preferably further comprising pressing the strain relief into a locked configuration, wherein the strain relief is securely engaged to the electrical power cord in the locked configuration. Pressing the strain relief into a locked configuration preferably comprises engaging one portion of the strain relief into a second portion of the strain relief in a direction perpendicular to length of the electrical power cord.

Pressing the strain relief into a locked configuration preferably comprises engaging one portion of the staring relief into a second portion of the strain relief in a direction parallel to length of the electrical power cord. The protrusions of the strain relief are preferably contoured having a first and a second beveled surface forming a ridge distal to the electrical power cord, and the mold cavity is preferably shaped to receive the protrusions of the strain relief and form a contact with the first and the second beveled surfaces, wherein when the top mold block is pressed toward the second mold block, the section of the mold cavity mold cavity adjacent to the first and second beveled surfaces urge the strain relief to move laterally along the electrical power cord to a desire location. The protrusions of the strain relief are preferably contoured having a first and a second beveled surface forming a ridge distal to the electrical power cord, and the mold cavity is shaped to receive the protrusions of the strain relief and form a contact with the first and the second beveled surfaces, wherein when the top mold block is pressed toward the second mold block, the section of the mold cavity mold cavity adjacent to the first and second beveled surfaces urge the strain relief to move along the electrical power cord to a desired angular orientation. The inner body assembly preferably further comprises one or more inner body protrusions projecting outward and away from the top of the inner body assembly, and the upper mold block is shaped to receive the inner body protrusions and form a seal surrounding the inner body protrusions to prevent the molten material from depositing on the top surface of the inner body protrusions. The inner body protrusions preferably indicates orientation.

In an eighth aspect, a method for manufacturing an overmolded electric plug with integrated strain relief is disclosed. The method comprises producing an inner body assembly comprising a wire assembly and an inner body, the wire assembly comprising an electrical power cord and electrical connectors, the inner body securing the electrical connectors, placing a strain relief around the electrical power cord, the strain relief having plurality of protrusions extending radially away from the electrical power cord, the strain relief having a coupling member extending away from the strain relief, and connecting the coupling member of the strain relief to the inner body assembly. The method further comprises producing an injection mold comprising a top mold block, a bottom mold block, and a socket mold block, the injection mold having a mold cavity shaped to correspond to the desired shape of the overmolded electric plug with integrated strain relief, the bottom mold block shaped to receive and detachably secure an inner body assembly and a strain relief, the socket mold block having socket connectors configured to receive the electrical connectors, the injection mold having a feeder injection port. The method further comprises coupling the electrical connectors to the socket connectors of the socket mold block, placing the inner body assembly and the strain relief into the bottom mold, and pressing the top mold block onto the bottom mold block. The method further comprises injecting a molten insulating material into the injection mold through the feeder injection port, the injected molten material urging the air within the mold to vent via the multiple air escape paths, and removing the overmolded electric plug from the mold.

In an eighth preferred embodiment, the strain relief has an outer surface having a plurality of protrusions, and the mold cavity is shaped to receive the protrusions of the strain relief and form a seal surrounding the protrusions of the strain relief to prevent the molten material from depositing on the outer surface of the protrusions of the strain relief. Placing a strain relief around the electrical power cord preferably comprises pre-locking the strain relief around the electrical power cord. Pressing the top mold block onto the bottom mold block preferably further comprising pressing the strain relief into a locked configuration, wherein the strain relief is securely engaged to the electrical power cord in the locked configuration. Pressing the strain relief into a locked configuration preferably comprises engaging one portion of the staring relief into a second portion of the strain relief in a direction perpendicular to length of the electrical power cord. Pressing the strain relief into a locked configuration preferably comprises engaging one portion of the staring relief into a second portion of the strain relief in a direction parallel to length of the electrical power cord. The inner body assembly preferably further comprises one or more inner body protrusions projecting outward and away from the top of the inner body assembly, and the upper mold block is shaped to receive the inner body protrusions and form a seal surrounding the inner body protrusions to prevent the molten material from depositing on the top surface of the inner body protrusions. The inner body protrusions preferably indicate orientation.

In a ninth aspect, an injection mold system is disclosed. The injection mold system comprises a top mold block having a top mold cavity shaped to correspond to the desired shape of the upper portion of an overmolded electric plug, a bottom mold block having a bottom mold cavity shaped to correspond to the desired shape of the bottom portion of the overmolded electric plug, the bottom mold block shaped to receive and detachably secure an inner body assembly having protruding electrical prongs, a socket mold block having socket connectors configured to receive the electrical prongs, and a feeder injection port. The top and bottom mold cavities are locally contoured to engage protrusions of a pre-locked strain relief and place the strain relief into a locked configuration, wherein the strain relief in the pre-locked configuration is able to move laterally about the electrical power cord, the strain relief in the locked configuration is secured to the electrical power cord.

In a ninth preferred embodiment, the upper mold block further comprises recesses configured for receiving protrusions on a strain relief and forming seals surrounding the strain relief protrusions to prevent the molten material from depositing on the top surface of the strain relief protrusions.

These and other features and advantages of the invention will become more apparent with a description of preferred embodiments in reference to the associated drawings.

DESCRIPTION OF THE DRAWINGS

FIG. 13 is a side, perspective view of a strain relief on an electrical power cord in an embodiment.

FIG. 14 is a schematic view of an overmolded strain relief showing internal details.

FIG. 15 is a top view of the overmolded strain relief.

FIG. 16 is a front, perspective view of a one-piece strain relief in an embodiment.

FIG. 17 is a side, perspective view of the locked strain relief in an embodiment.

FIG. 18 is a front view of the locked strain relief in an embodiment.

FIG. 22 is a side, exploded view of a strain relief in an embodiment.

FIG. 23 is a side, perspective view of a pre-locked strain relief surrounding an electrical power cord.

FIG. 24 is a side, perspective view of a strain relief surrounding an electrical power cord.

DETAILED DESCRIPTION OF THE PREFERRED EMBODIMENTS

Figure 1:
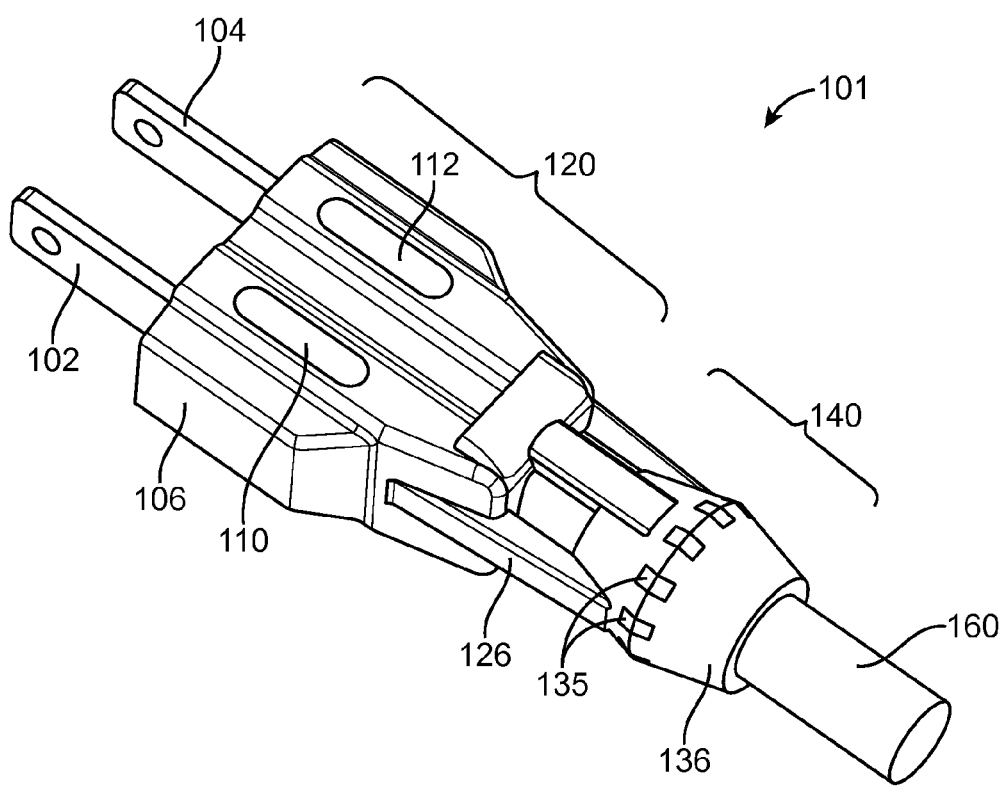
FIG. 1 is a top, perspective view of an electrical plug with integrated strain relief.

The following preferred embodiments are directed to strain relief and electrical plugs with integrated strain relief. Other preferred embodiments are directed to the methods and systems for manufacturing electrical plugs with integrated strain relief.

Many electrical plugs are employed in applications where the electrical plugs are plugged-in and are unplugged frequently throughout the lifetime of an electrical tool or device. Ideally, users should unplug a device by firmly grasping and pulling the electrical plug from the socket. However, many users instead grasp and pull the electrical power cord. Unless the electrical plug incorporates strain relief, these plugs may fail as a user may inadvertently tear out the electrical wires from the plug. Moreover, many users may be uncertain if an electrical plug incorporates strain relief, and may select electrical powers cords unsuitable for heavy-duty applications.

One or more embodiments provide a strain relief which is secured to an electrical power cord. The strain relief may comprise two sections which mate to form the strain relief. Other preferred embodiments may comprise a single one-piece body with multiple sections. One or more preferred embodiments employ a ratcheting mechanism which permanently secures the strain relief on the electrical power cord. The strain relief may be partially assembled in a pre-locked configuration on the electrical power cord where the strain relief may be positioned on the power cord, and then be further pressed to a locked configuration in which the is securely attached to the power cord.

In a preferred embodiment, the strain relief may have multiple protrusions extending radially away from the length of the electrical power cord. After the strain relief is overmolded with an overmold material, the outer surfaces of the protrusion are exposed and are visible to users. In a preferred embodiment, the protrusions have a different color than that of the overmold material. The shape and design of the protrusions may vary.

In a preferred embodiment, the shape of the protrusions enables the strain relief to be automatically centered and aligned on the electrical power cord during the manufacturing process. In an embodiment, the protrusions of the strain relief are contoured to form angled bevels leading to a distal ridge. The tooling which locks the strain relief is also countered. When the tooling proceeds to lock the strain relief, the contours of the tooling will urge the strain relief to move to the proper position on the electrical power cord. The tooling then presses the ratcheting mechanism of the pre-locked strain relief and acts to lock the strain relief in place.

In one or more embodiments, the electrical plug may have an inner body assembly which holds the electrical prongs. The inner body may be essentially encapsulated in an overmolding process. In an embodiment, the strain relief may have an "arm" or a coupling member which connects the strain relief to an inner body of the plug. The strain relief and the inner body may then be overmolded to have a protective overmold housing encapsulating most of the inner body and strain relief. Hence, should a user pull the electrical power cord to unplug an electrical plug, the strain relief secures the jacket of the power cord to the inner wires, and transfers the force to the inner body through the coupling member of the strain relief.

In one or more embodiments, the strain relief may provide strain relief though the overmold material. Should a user pull the electrical power cord to unplug an electrical plug, the strain relief secures the jacket of the power cord to the inner wires, and transfers the force to the inner body through the overmold material.

Teachings related to electrical plugs employing inner bodies and the manufacture thereof are discussed in U.S. application Ser. Nos. 14/197,744, 14/198,185, 14/198,199, filed Mar. 5, 2014 each entitled "INSULATING ELECTRICAL PLUGS AND METHOD OF MANUFACTURE," the disclosures of which are incorporated herein by reference in their entirety.

As used herein and as is commonly known in the art, electric plugs are connectors which engage with electrical sockets to transmit electrical current and power. While embodiments discussed herein refer to plugs generally conforming to United States and North American 120 volt standards, plugs conforming to other standards, other voltages, direct current, and multiple phase applications are contemplated in one or more embodiments. While embodiments discussed below may describe flat plug, it shall be understood that the general discussion of flat plugs and straight plugs, and the manufacture thereof generally apply to both configurations.

In one or more embodiments, a cylindrical coordinate system may be employed to describe the relative configuration of the components. Reference to a cylindrical or longitudinal axis may refer generally to the axis defined by the length of the electrical power cord immediately surrounding the plug and strain relief. The distance from the longitudinal axis may be described as the radial distance or radius. Reference to the term "radially away" refers to directions perpendicular to the longitudinal axis.

In one or more embodiments, the overmold material may be Polyvinyl Chloride ("PVC"), thermoplastics, soft plastics, polymers, or other materials for example. The strain relief and the plug inner body may be fabricated with plastics, polymers, and other materials for example. In one or more embodiments, the material of the strain relief and the plug inner body may be sufficiently pliable so that components deform or flex to enable components to snap into place for various forms of ratcheting mechanisms.

FIG. 1 is a top, perspective view of an electrical plug with integrated strain relief 101. The plug with integrated strain relief 101 comprises a plug section 120, a strain relief section 140, and an electrical power cord 160. The plug section 120 comprises an overmolded inner body (discussed below) securing the electrical prongs 102 and 104 in place. The inner body has protrusions 110 and 112 which extend through the overmold material 106 and are visible. The strain relief section 140 has an inner strain relief (discussed below) that surrounds and secures the electrical power cord 160. The inner strain relief has protrusions 135 which extend through the overmold material 136 which are visible. In an embodiment, the strain relief may have multiple protrusions having a length parallel with the length of the electrical power cord 160. The strain relief section is physically connected to the electrical plug section 120 through the overmold sections 126 in an embodiment. Other coupling mechanisms are discussed below in greater detail. The electrical plug protrusions 110 and 112 and the strain relief protrusions 135 may have a color different from the surrounding overmold material and serve as visible evidence that the electrical plug 101 has an integrated strain relief for heavy-duty applications. In one or more embodiments, the protrusions 110, 112, and 135 may be yellow, red, blue, or orange, while the overmold material 106, 126, and 136 may be darker.

Figure 2:
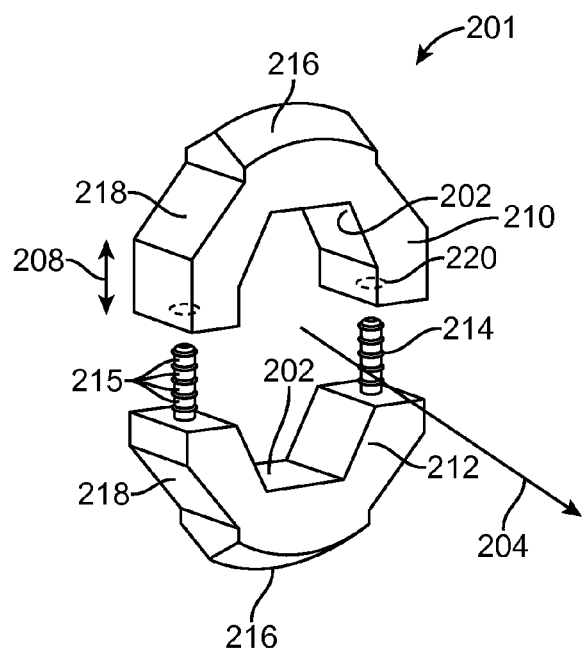
FIG. 2 is a top, exploded view of a strain relief in an embodiment.
Figure 3:
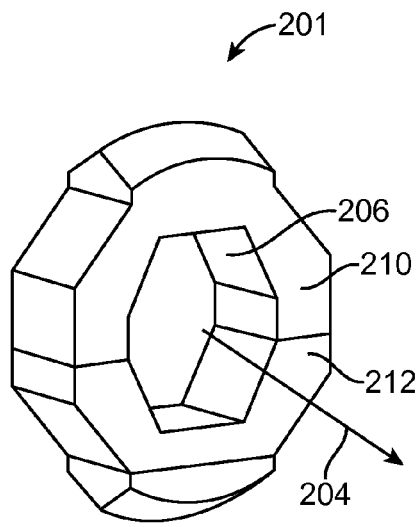
FIG. 3 is a top, perspective view of an assembled strain relief in an embodiment.
Figure 4:
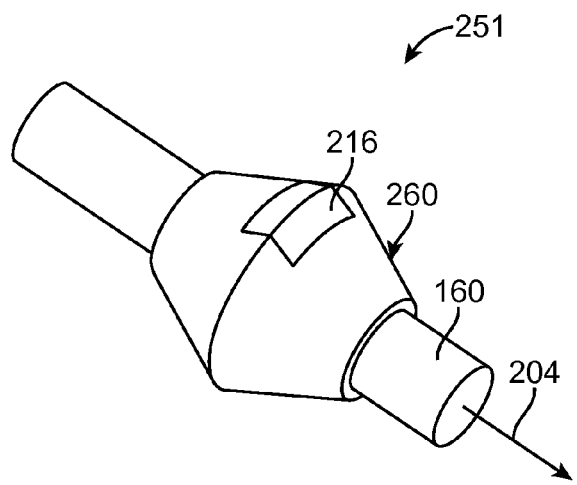
FIG. 4 is a top, perspective view of the strain relief depicted in FIGS. 2 and 3 having an overmolded housing.

FIGS. 2-4 illustrate the composition and assembly of a strain relief 201 in one or more embodiments. A cylindrical coordinate system may be employed to describe the relative configuration of the components. The cylindrical or longitudinal axis 204 may refer generally to the axis defined by the length of the electrical power cord 160 immediately surrounding the plug and strain relief as shown in FIG. 4. The distance away from the longitudinal axis may be described as the radial distance or radius. Reference to the term "radially away" refers to directions perpendicular to the longitudinal axis such as axis 208 shown in FIG. 2. The passageway 206 is the internal space through which an electrical power cord 160 will be placed.

The strain relief 201 is comprised of two sections with a first half-shell 212 having a plurality of posts 214 extending from the first section 212 in a direction parallel with axis 208 (i.e., a direction perpendicular to the length of the electrical power cord 160 immediately surrounding the strain relief 201). The second half-shell 210 has a plurality of holes 220 where each of the holes 220 are formed to receive and secure the corresponding post 214 during an assembly process. Each of the posts 214 has multiple rings 215 along the length of the post 214. The rings 215 on the posts 214 may act as a ratcheting mechanism where posts 214 may be readily inserted into the holes 220, but the shape of the posts 214 and holes 220 may prevent the posts 214 from being removed from the holes 220. The strain relief 201 has an inner clamping surface 202 and an outer surface 218, where the inner clamping surface 202 is configured to form a passageway 206 having a longitudinal axis 204 for surrounding and securing an electrical power cord 160. As shown in FIG. 2, the strain relief 201 may be manually positioned around the electrical power cord 160 in a pre-locked configuration where the first and second half-shells 210 and 212 do not readily separate but are not fully engaged to secure the electrical power cord 160. As shown in FIG. 3, once the strain relief 201 is properly positioned, the first and second half-shells 210 and 212 may be fully engaged to a locked position where the strain relief 201 securely engages the electrical power cord 160.

The outer surface 218 has a plurality of protrusions 216 extending radially away from the longitudinal axis 204. In an embodiment, the strain relief 201 has two protrusions on opposite sides having a length perpendicular to the length of the electrical power cord 160. FIG. 4 shows the overmold strain relief 251 having an overmold housing 260 partially surrounding the strain relief clamp 201, where the outer surfaces of the protrusions 216 of the strain relief extends to or beyond the outer surface of the overmold housing 260, and is visible to a user.

Figure 5:
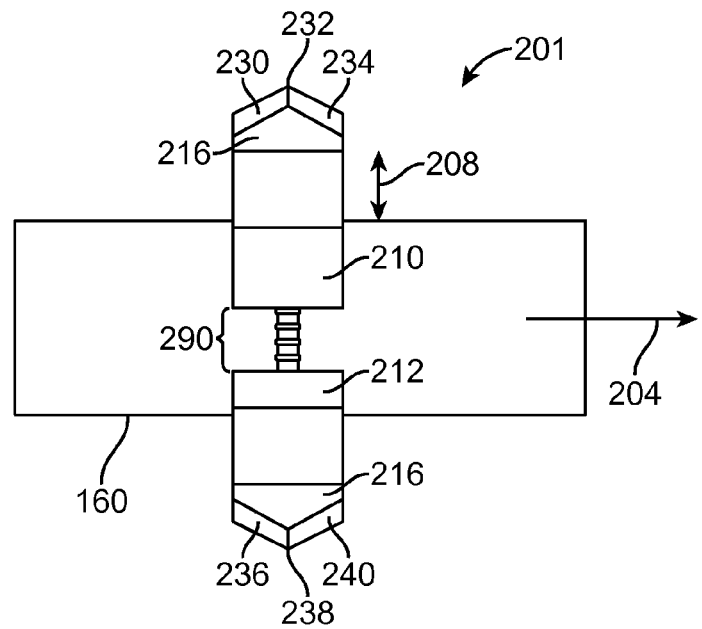
FIG. 5 is a side view of strain relief surrounding an electrical power cord.
Figure 6:
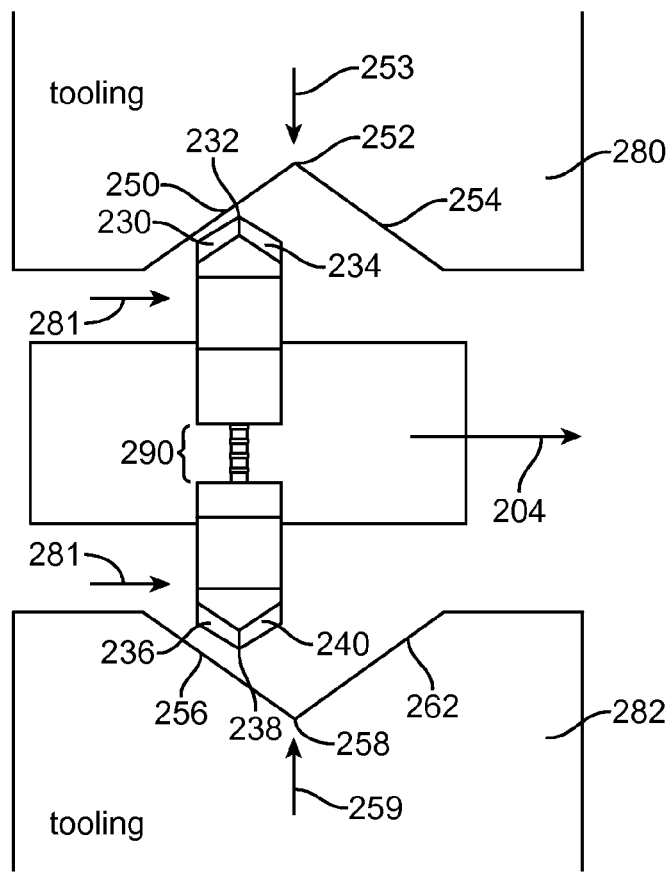
FIG. 6 is a schematic illustration of the strain relief urged to a desired location as a result of the contoured tooling engaging with the bevels of the protrusions of the staring relief.

FIGS. 5-8 illustrate features of the strain relief which provide lateral and orientation self-placement during an assembly process. As seen in FIGS. 5 and 6, the protrusions 216 of the strain relief 201 as well as the top and bottom mold blocks 280 and 282 are contoured to facilitate self-alignment of the strain relief 201 within the top and bottom mold blocks 280 and 282.

As seen in FIG. 5, the protrusions 216 are contoured to have a first beveled surface 230 and a second beveled surface 234 forming a ridge 232 distal to the longitudinal axis 204. In an embodiment, the first and the second beveled surfaces 230 and 234 are on opposite sides of the strain relief 201. The lower protrusion 216 is also contoured to have a first beveled surface 236 and a second beveled surface 240 forming a ridge 238 distal to the longitudinal axis 204. In one or more embodiments, the ridges 232 and 238 may form a line, or the ridges 232 and 238 may form a plateau. In one or more embodiments, the beveled surfaces 230, 234, 236, and 240 may be generally flat, or they may have a curvature. In an embodiment, the top mold block 280 is contoured to have a first and a second beveled surface 250 and 254 leading to a surface 252 distal to the longitudinal axis 204. The bottom mold block 282 is contoured to have a third and a fourth beveled surface 256 and 262 leading to a surface 258 distal to the longitudinal axis 204.

The assembly process begins by placing the strain relief 201 on the electrical power cord 160 in a pre-locked configuration. In a pre-locked configuration, the first half-shell 210 and the second half-shell 212 are not fully mated so that a gap 290 allows the strain relief 201 to move laterally on the electrical power cable 160. As the top and bottom mold blocks 280 and 282 begin to close, the surfaces 250, 252, and 254 of the top mold block engage 280 with the beveled surfaces 230 and 234 and the ridge 232 of the top protrusion 216, and the surfaces 256, 258 and 262 of the bottom mold block 282 engage with the beveled surfaces 236 and 240 and the ridge 238 of the bottom protrusion 216. The vertical forces 253 and 259 exert lateral forces 281 onto the strain relief 201, which moves the strain relief 201 to the correct lateral position and orientation. Once the strain relief 201 moves to the correct location shown in FIG. 7, all of the beveled surfaces of the protrusions 230, 234, 236, and 240 as well as the ridges 232 and 238 are in contact with the top and bottom mold blocks 280 and 282 which removes the net lateral force 281 and vertically presses the strain relief 201 into a locked position.

Figure 7:
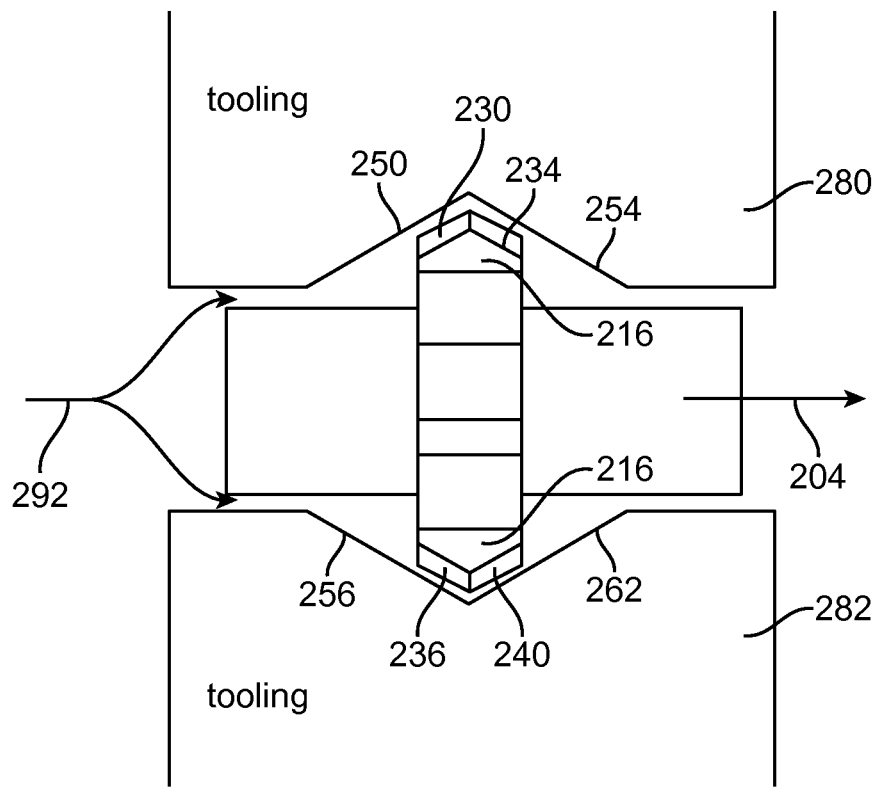
FIG. 7 is a schematic illustration of the tooling placing and locking in place the strain relief to the proper position on the electrical power cord.
Figure 8:
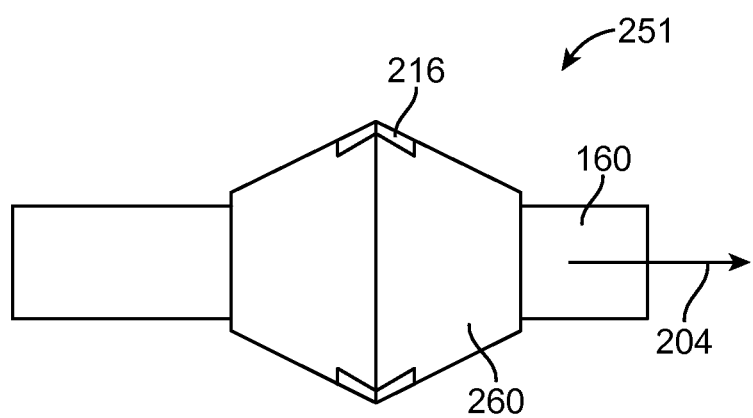
FIG. 8 is a side view of the overmolded strain relief.
Figure 9:
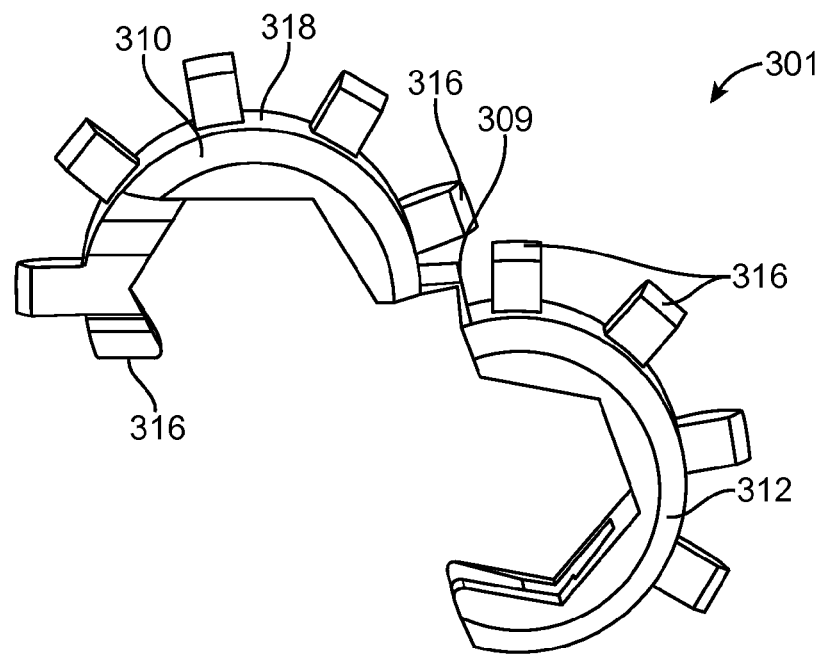
FIG. 9 is a front, perspective view of a one-piece strain relief in an embodiment.
Figure 10:
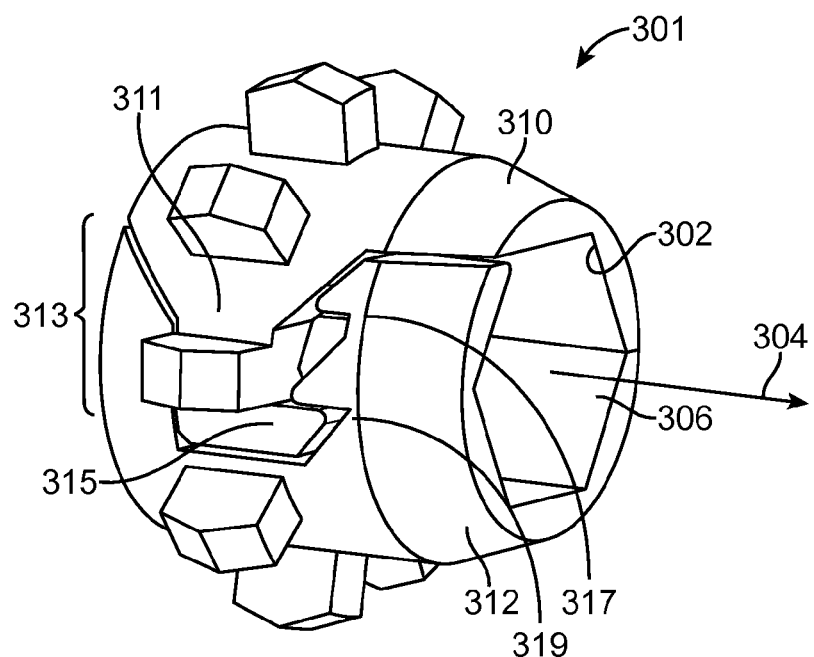
FIG. 10 is a side, perspective view of the strain relief in a pre-locked configuration.

As illustrated in FIG. 7, once the top mold block 280 is seated on the bottom mold blocks 282, overmold material 292 is injected into the formed cavity. The mold cavity formed by the surfaces 250 and 254 of the top mold block 280 and the surfaces 256 and 262 of the bottom mold block 282 is shaped to receive the protrusions 216 of the strain relief 201 and form a seal surrounding the bevels 230, 234, 236, and 240 of the protrusions 216 of the strain relief 201 to prevent the molten insulating material from depositing on the outer surfaces 230, 234, 236, ands 240 of the protrusions 216. After the overmold material sets, the top and bottom mold blocks 280 and 282 are separated rendering the overmolded staring relief shown in FIG. 8.

FIGS. 9-12 depict a one-piece strain relief 301 having a first section 310 and a second section 312. The strain relief 301 has an inner clamping surface 302 and an outer surface 318, where the inner clamping surface 302 is configured to form a passageway 306 having a longitudinal axis 304 (i.e., parallel with the length of the electrical power cord 160 immediately surrounding the strain relief 301) for surrounding and securing an electrical power cord 160. The outer surface 318 has a plurality of protrusions 316 extending radially away from the longitudinal axis 304. In an embodiment, the outer surface 318 has multiple protrusions 316 having a length parallel with the longitudinal axis 304.

The first section 310 is hingably connected to the second section 312 such that the first section 310 is configured to rotate relative to the second section 312 about the longitudinal axis 304 (i.e., the length of the electrical cord immediately surrounding the strain relief 301). The first section 310 couples to the second section 312 via flexible member 309. As such, the flexible member 309 hingably couples the first and second sections 310 and 312 because the flexile member 309 acts as a hinge which allows the first section 310 and the second section 312 to rotate about the longitudinal axis 304. The flexible member 309 may be thinner or may be made more flexible so that the flexible member 309 acts as a hinge.

The first section 310 engages with the second section 312 through a latching mechanism 313. The first section 310 has a tab 311 having a pawl 315. The second section 312 has a first notch 317 and a second notch 319. The pawl 315 is a protruding finger which engages with the notches 317 and 319. The pawl 315 and the notches 317 and 319 are shaped to allow the pawl 315 to move from notch 317 to 319 with moderate force to flex the material of the strain relied 301. However, the asymmetrical shape of the pawl 315 and the notches 317 and 319 prevent the pawl 315 from easily moving from notch 319 to notch 317.

Figure 11:
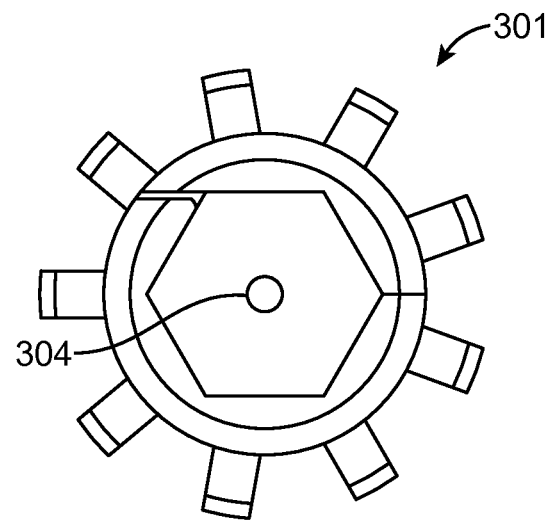
FIG. 11 is a front view of the strain relief in a locked configuration.

During assembly, the pawl 315 snaps into notch 317 to form a pre-lock configuration where the first and second sections 310 and 312 are engaged, but the strain relief 301 would not fully engage with an electrical power cord 160. The first section 310 may be further pressed into the second section 312 such that the pawl 315 snaps into the second notch 319 to form the locked configuration such that the strain relief 301 would securely engage with an electrical power cord 160. FIG. 11 is a front view of the strain relief 301 in a locked configuration.

Figure 12:
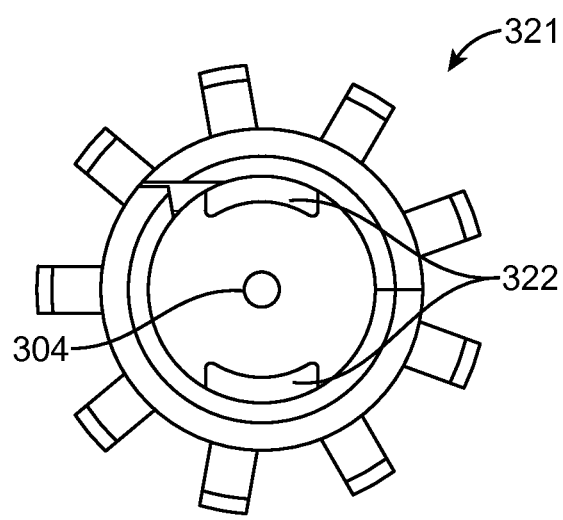
FIG. 12 is a front view of a strain relief having ridges on the inner clamping surface of the strain relief.

In one or more embodiments, the clamping surface such as clamping surface 304 may be modified to more fully secure the strain relief to an electrical power cord. For example, FIG. 12 is a front view of a strain relief 321 having ridges 322 on the inner surface of the strain relief. The ridges 322 may grip into and securely engages the electrical power cord 160.

FIGS. 13-15 illustrate key features of an overmolded strain relief 332. Strain relief 331 is shown positioned and secured to the electrical power cord 160. In one or more embodiments, the strain relief 331 has a similar latching mechanism 313 as discussed above with respect to strain relief 301 in FIGS. 9-10. FIG. 14 illustrates the internal details of the strain relief 331 partially encapsulated with the overmold housing 335. As seen in FIG. 15, the protrusions 333 are visible in the overmold housing 335.

FIGS. 16-18 depict a one-piece strain relief 341 having a first section 340 and a second section 342. The strain relief 341 has an inner clamping surface 352 and an outer surface 347, where the inner clamping surface 352 is configured to encircle a longitudinal axis 344 for surrounding and securing an electrical power cord 160. The inner clamping surface 352 has a plurality of ridges 353 for engaging with an electrical power cord 160. The outer surface 347 has a plurality of protrusions 346 extending radially away from the longitudinal axis 344.

The first section 340 is hingably connected to the second section 342 such that the first section 340 is configured to rotate relative to the second section 342 about the longitudinal axis 344 (i.e., the length of the electrical power cord 160). The first section 340 couples to the second section 342 via flexible member 345.

The first section 340 engages with the second section 342 through a latching mechanism 343. The first section 340 has a pawl 348, and the second section 342 has a notch 350. When the first section 340 is engaging with the second section 342, the pawl 348 snaps into notch 350 to form a locked configuration where the first and second sections 340 and 342 are engaged to secure an electrical power cord 160. Additional notches in the second section 342 are contemplated in one or more embodiments.

Figure 19:
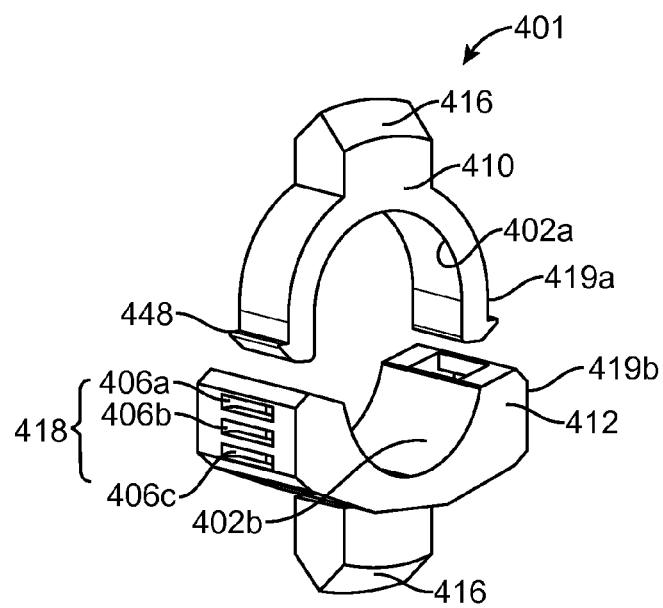
FIG. 19 is a side, perspective view of a two-piece strain relief in an embodiment.
Figure 20:
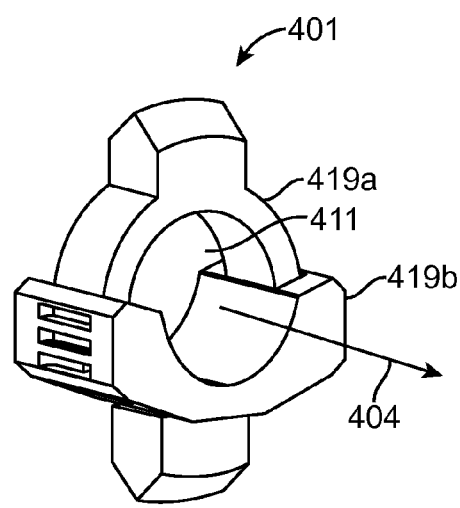
FIG. 20 is a side, perspective view of the assembled strain relief in an embodiment.
Figure 21:
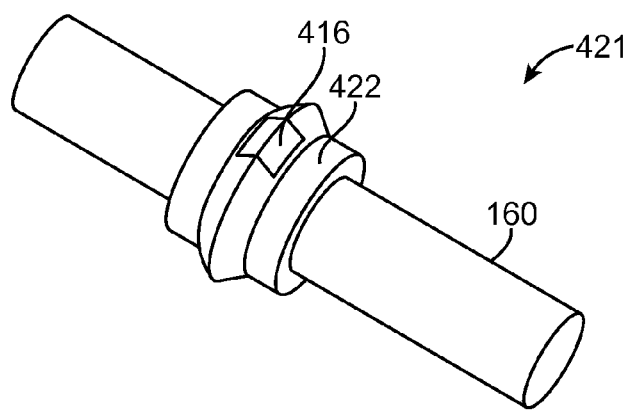
FIG. 21 is a top, perspective view of the overmolded strain relief in an embodiment.

FIGS. 19-21 depict a two-piece strain relief 401 having a first section 410 and a second section 412 having an essentially "U" shaped half-shell. The strain relief 401 has inner clamping surfaces 402a and 402b on the first and second sections 410 and 412 respectively. The strain relief 401 has outer surface 419a and 419b on the first and second sections 410 and 412 respectively, where the inner clamping surfaces 402a and 402b are configured to form a passageway 411 having a longitudinal axis 404 for surrounding and securing an electrical power cord 160. The outer surfaces 419a and 419b have a plurality of protrusions 416 extending radially away from the longitudinal axis 404.

The first section 410 has two pawls 448 extending away from the first section 410. The second section 412 has two racks 418 of teeth 406a-406c, where each rack 418 of teeth 406a-406c is configured to receive the corresponding pawl 448 from the first section 410 during an assembly process. As the first section 410 is urged downward to the second section 412, the pawls 448 first engage with teeth 406a, and then with teeth 406b in the pre-lock configurations. As the first section is further urged downward, the pawls 448 engage with teeth 406c to form the locked configuration. FIG. 21 depicts the overmolded strain relief 421 comprising the strain relief 401 and the overmold housing 422. The protrusions 416 are visible in the overmolded strain relief 421. In an embodiment, the strain relief 341 has two protrusions 346 on opposite sides having a length perpendicular with the length of the electrical power cord 160.

FIGS. 22-24 depict a two-piece strain relief 451 having a first section 460 and a second section 462 shaped essentially as half-shells. The strain relief 451 has inner clamping surfaces 452a and 452b on the first and second sections 460 and 462 respectively. The strain relief 451 has outer surface 458a and 458b on the first and second sections 460 and 462 respectively, where the inner clamping surfaces 452a and 452b are configured to encircle a longitudinal axis 454 for surrounding and securing an electrical power cord 160. The outer surfaces 458a and 458b have a plurality of protrusions 456 extending radially away from the longitudinal axis 404. In an embodiment, the strain relief 451 has two protrusions 456 on opposite sides having a length perpendicular with the length of the electrical power cord 160.

The first section 460 has a first and a second rack 470a and 470b and a first and a second guide arm 472a and 472b extending away from the first section 460. The second section has a third and a fourth rack 476a and 476b a third and fourth guide arms 474a and 474b extending away from the second section 462. The third and fourth racks 476a and 476b are configured to receive the first and second racks 470a and 470b during an assembly process. As illustrated in FIG. 23, the guide arms 472a, 472b, 474a, and 474b serve to keep the racks 470a and 476a adjacent and 470b and 474b adjacent after assembly.

Figures 25, 26:
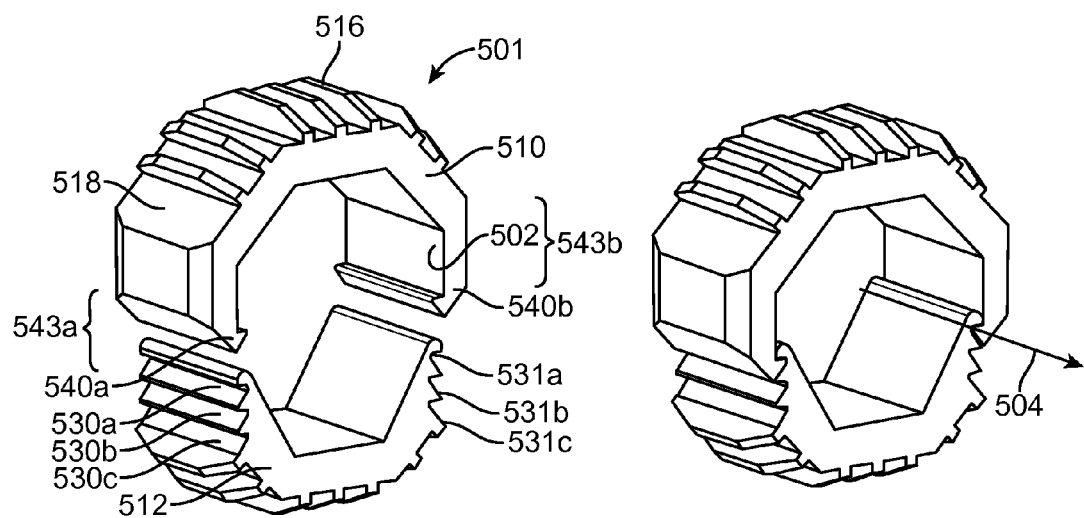
FIG. 25 is a side, exploded view of a strain relief in an embodiment.
FIG. 26 is a side, perspective view of a pre-locked strain relief surrounding an electrical power cord.
Figure 27:
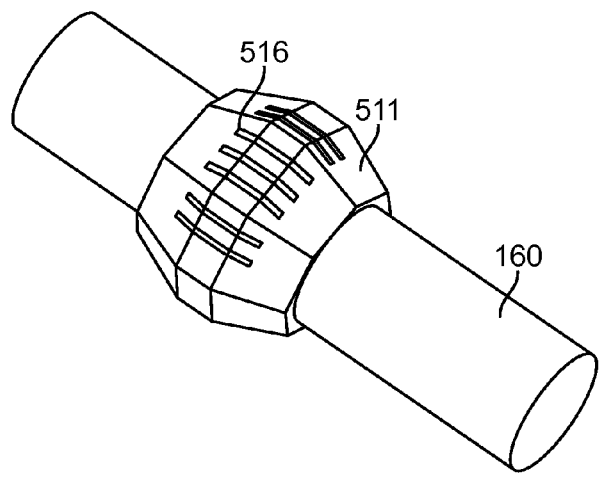
FIG. 27 is a top, perspective view of an overmolded strain relief securing an electrical power cord.

FIGS. 25-27 depict a two-piece strain relief 501 having a first section 510 and a second section 512 shaped essentially as half-shells. The strain relief 501 has an inner clamping surface 502 and an outer surface 518, where the inner clamping surface 502 is configured to encircle a longitudinal axis 504 for surrounding and securing an electrical power cord 160. The outer surface 518 has a plurality of protrusions 516 extending radially away from the longitudinal axis 344. In an embodiment, the strain relief 501 has multiple protrusions 516 having a length parallel with the length of electrical power cord 160.

The first section 510 engages with the second section 512 through a latching mechanisms 543a and 543b. The first section 510 has pawls 540a and 540b, and the second section 512 has notches 530a-530c and 531a-531c. When the first section 510 is engaging with the second section 512, the pawl 540a snaps into notch 530a and the pawl 540b snaps into notch 531a for the pre-locked configuration. As the first section 510 is pressed further into the second section 512, the pawl 540a snaps into notch 530c, and pawl 540b snaps into notch 531c for the locked configuration. As seen in FIG. 27, the protrusions 516 extend through the overmold housing 511 and are visible to the user.

Figures 28, 29:
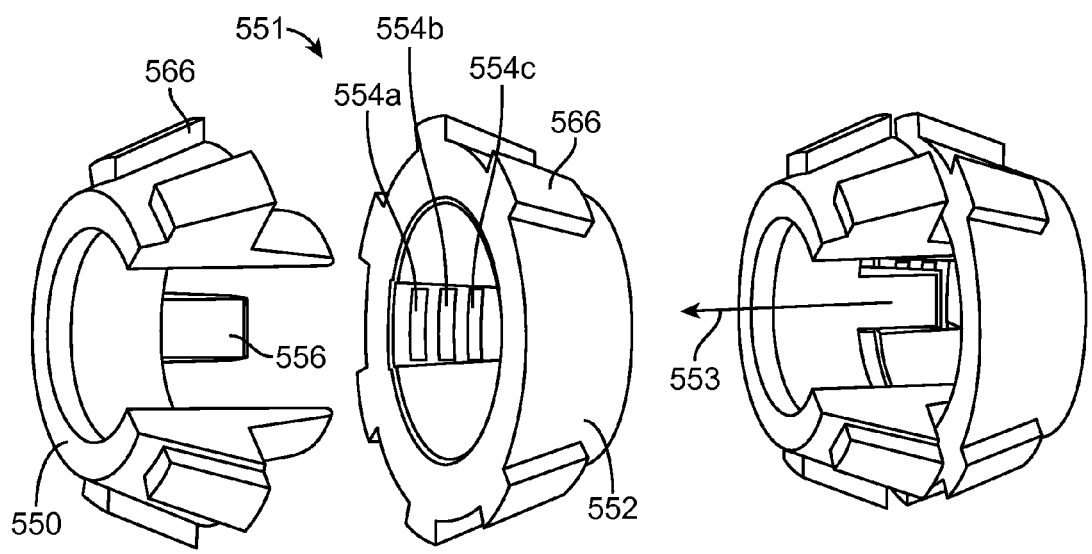
FIG. 28 is a side, exploded view of a two-piece strain relief in an embodiment.
FIG. 29 is a side, perspective view of a pre-locked strain relief.
Figure 30:
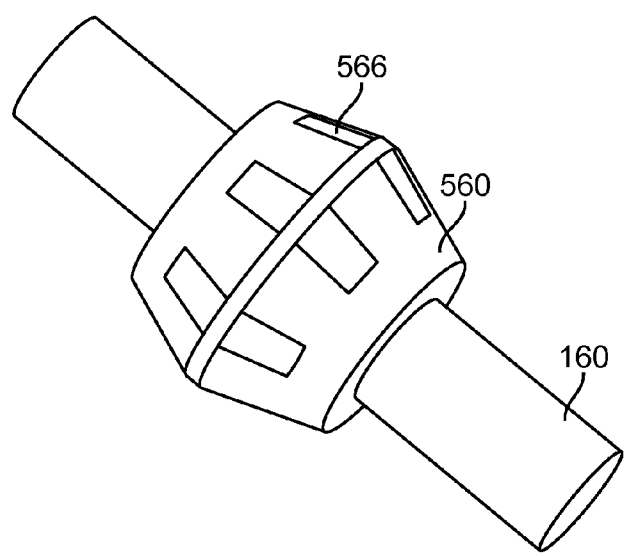
FIG. 30 is a top, perspective view of an overmolded strain relief securing an electrical power cord.

FIGS. 28-30 depict a two-piece strain relief 551 having a first generally cylindrical section 550 and a second generally cylindrical section 552, each having protrusions 566. The first section 550 has a pawl 556 extending away, and the second section has a set of teeth 554a, 554b, and 554c configured for mating with the pawl 556. The teeth 554a-554c have a length perpendicular to the longitudinal axis 553 (i.e., the direction of the length of the electrical power cord). The first section 550 mates with the second section 552 by moving in a direction parallel with the longitudinal axis 553. The multiple teeth 554a-554c enable the first and second sections 550 and 552 to engage in pre-locked and locked configurations. FIG. 30 illustrates that the protrusions 566 are visible through the overmold housing 560.

Figure 31:
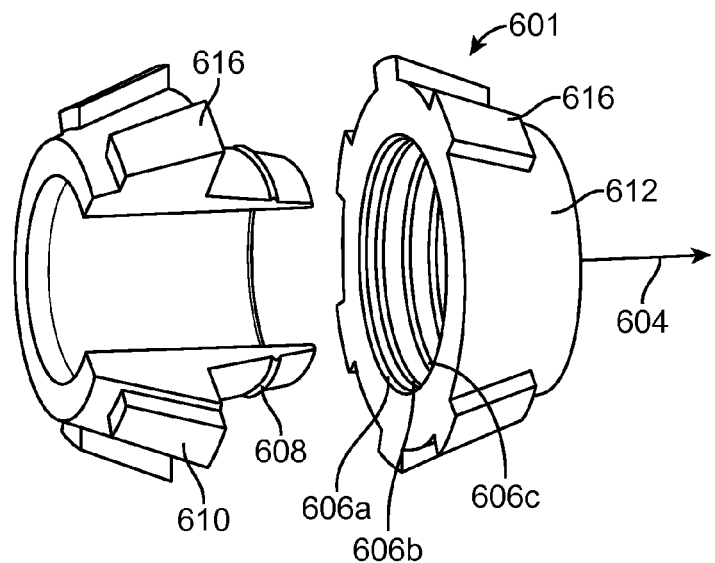
FIG. 31 is a side, exploded view of a two-piece strain relief in an embodiment.

FIG. 31 illustrates a two-piece strain relief 601 having a first section 610 and a second section 612. The strain relief 601 has a plurality of protrusions 616 extending radially away from the longitudinal axis 604. The first section has an annular pawl 608, and the second section has a series of recesses 606a-606c configures to receive and mate with the pawl 608 during an assembly process. The first section 610 mates with the second section 612 by moving in a direction parallel with the longitudinal axis 604 (i.e., the direction of the length of the electrical power cord). The multiple teeth 606a-606c enable the first and second sections 610 and 612 to engage in a pre-locked and a locked configuration.

Figure 32:
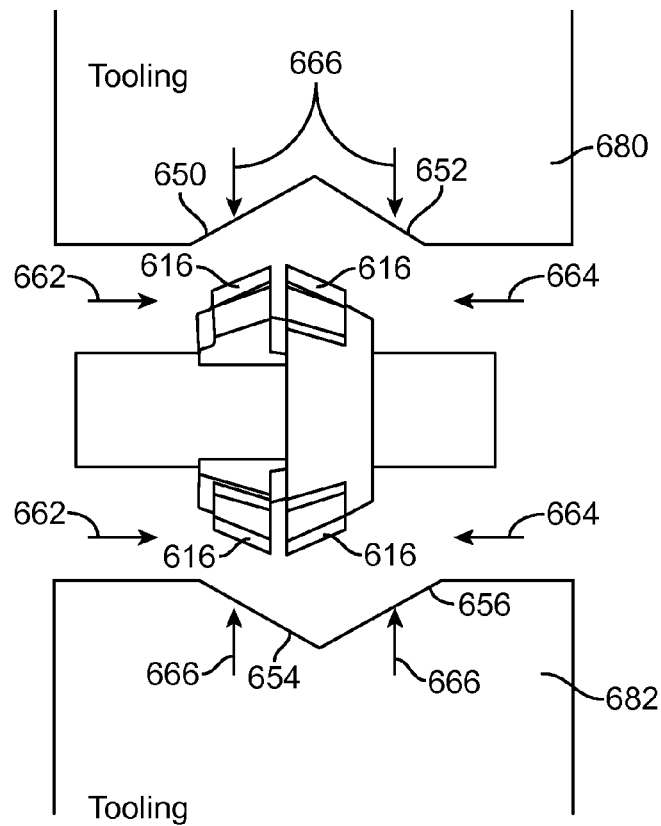
FIG. 32 is a schematic illustration of the strain relief urged to a desired location and locking as a result of the contoured tooling engaging with the bevels of the protrusions of the strain relief.

FIG. 32 illustrates the self-aligning feature of the strain relief 601 placed into an injection mold having top and bottom mold blocks 680 and 682. The top mold blocks have bevels 650 and 652, and the bottom mold block has beveled surface 654 and 656. When the vertical forces 666 act to close the top mold block 680 onto the bottom mold block 682, the beveled surfaces 650, 652, 654, and 656 engage with the beveled protrusions 616 and cause lateral forces 662 and 664 to position the strain relief 601 into the correct position and orientation. Once the strain relief 601 is in the proper position, the lateral forces 662 and 664 act to place the strain relief 601 into a locked configuration.

Figure 33:
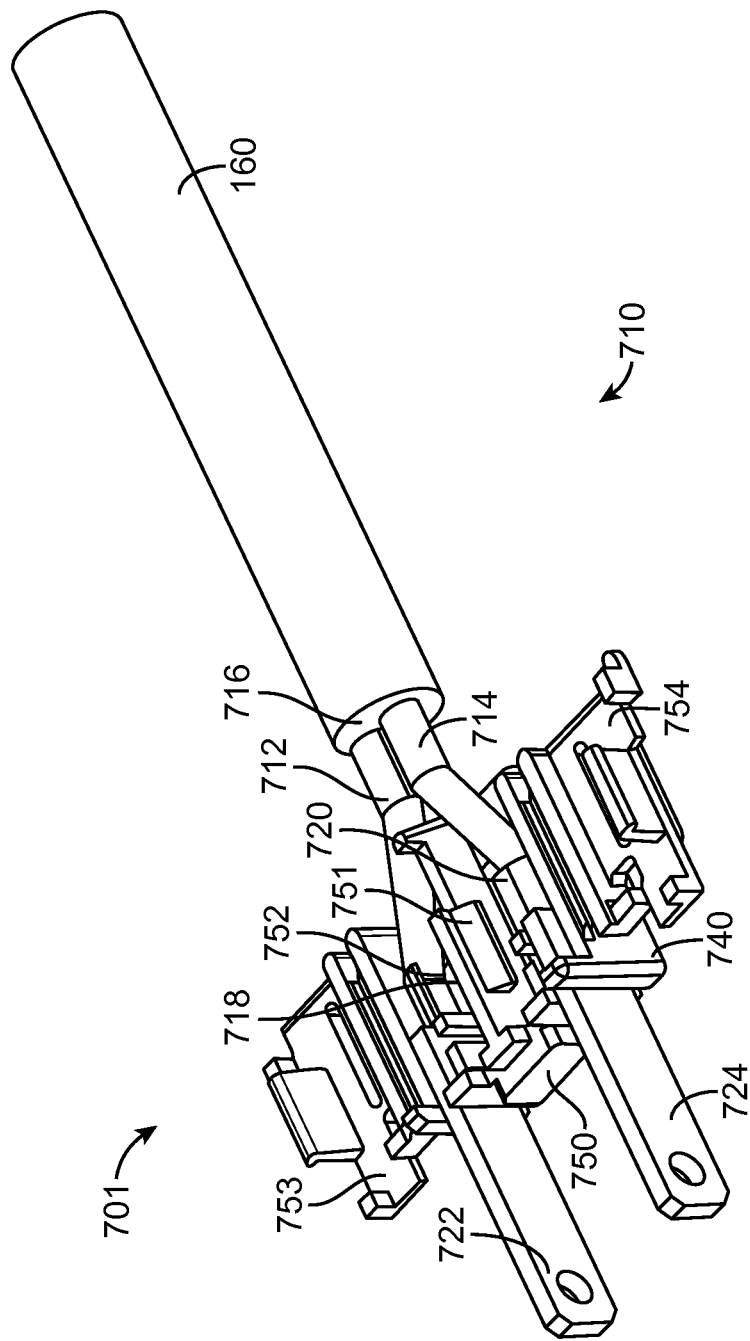
FIG. 33 is a side, perspective view of an inner body assembly comprising a wire assembly and an inner body in an embodiment.

FIGS. 33-44 illustrate the assembly and process for manufacturing an electrical plug with integrated strain relief 101 in one or more embodiments. FIG. 33 is a top, perspective view of an inner body assembly 701 comprising a wire assembly 710 and a one-piece inner body 740. The wire assembly 710 comprising an electrical power cord 160 having at least two wires 712 and 714 enclosed within an insulating cable jacket 716. The wire assembly further comprising at least two electrical connectors 718 and 720 each electrical connector having an electrical prong 722 and 724, the electrical connectors connected to a corresponding wire forming at least two electric power lines. The inner body 740 secures and essentially surrounds the electrical connectors 718 and 720 and a portion of the wire proximal to the electrical connectors. The one-piece inner body 740 comprises a base 750 having one or more latching mechanisms 751 and 752, a first cover 753 hingably coupled to the base 750 on a first side of the base 750, and a second cover 754 hingably coupled to the base 750 on a second side of the base 750, the second side of the base opposite that of the first side of the base.

Figure 34:
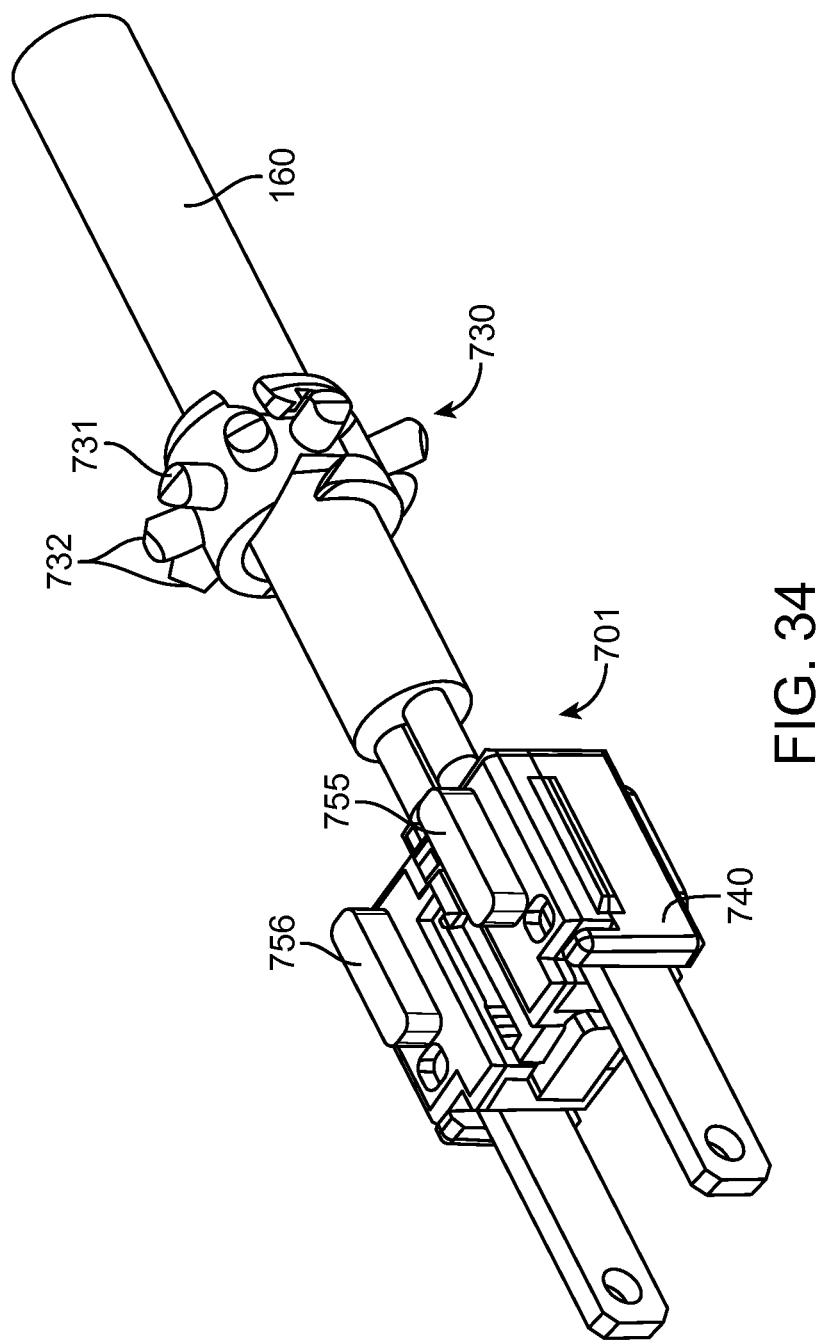
FIG. 34 is a side, perspective view of a strain relief surrounding the electrical power cord in a pre-locked configuration.
Figure 35:
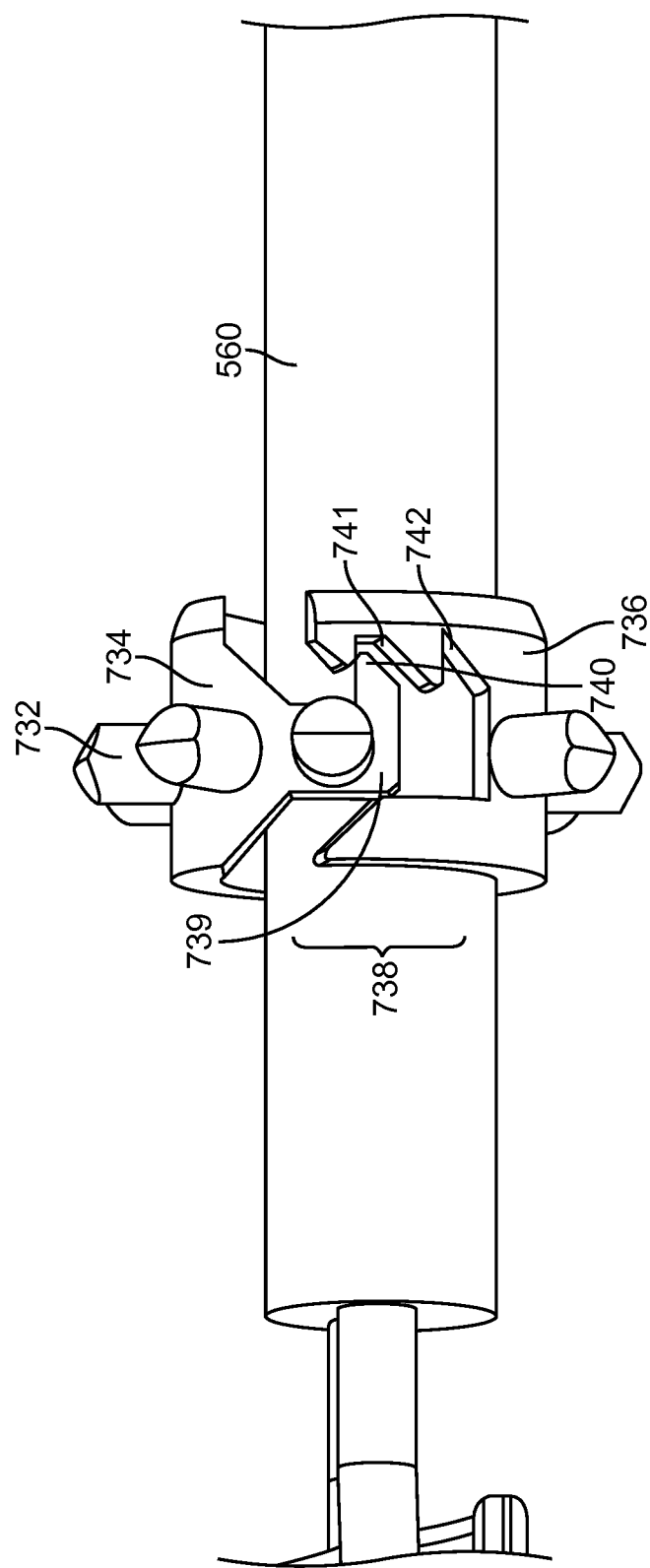
FIG. 35 is a side, perspective view showing details of the strain relief surrounding the electrical power cord in a pre-locked configuration.

FIG. 34 is a top, perspective view of the inner body assembly 701 and a strain relief 730. The inner body 740 has one or more inner body protrusions 755 and 756 projecting outward and away from the inner body 740. In an embodiment, the inner body protrusions 755 and 756 are shaped to indicate an orientation. The strain relief 730 has several protrusions 731 with beveled surfaces 732. As seen in FIG. 35, the strain relief 730 comprises a one-piece body having first section 734 and a second section 736. The first section 734 engages with the second section 736 through a latching mechanism 738. The first section 734 has a tab 739 with pawl 740. The second section 736 has a first notch 741 and a second notch 742. As depicted in FIG. 35, the first section 734 is engaging with the second section 736, and the pawl 740 snaps into notch 741 to form a pre-lock configuration where the first and second sections 734 and 736 are engaged, but would not fully engage with an electrical power cord 160.

Figure 36:
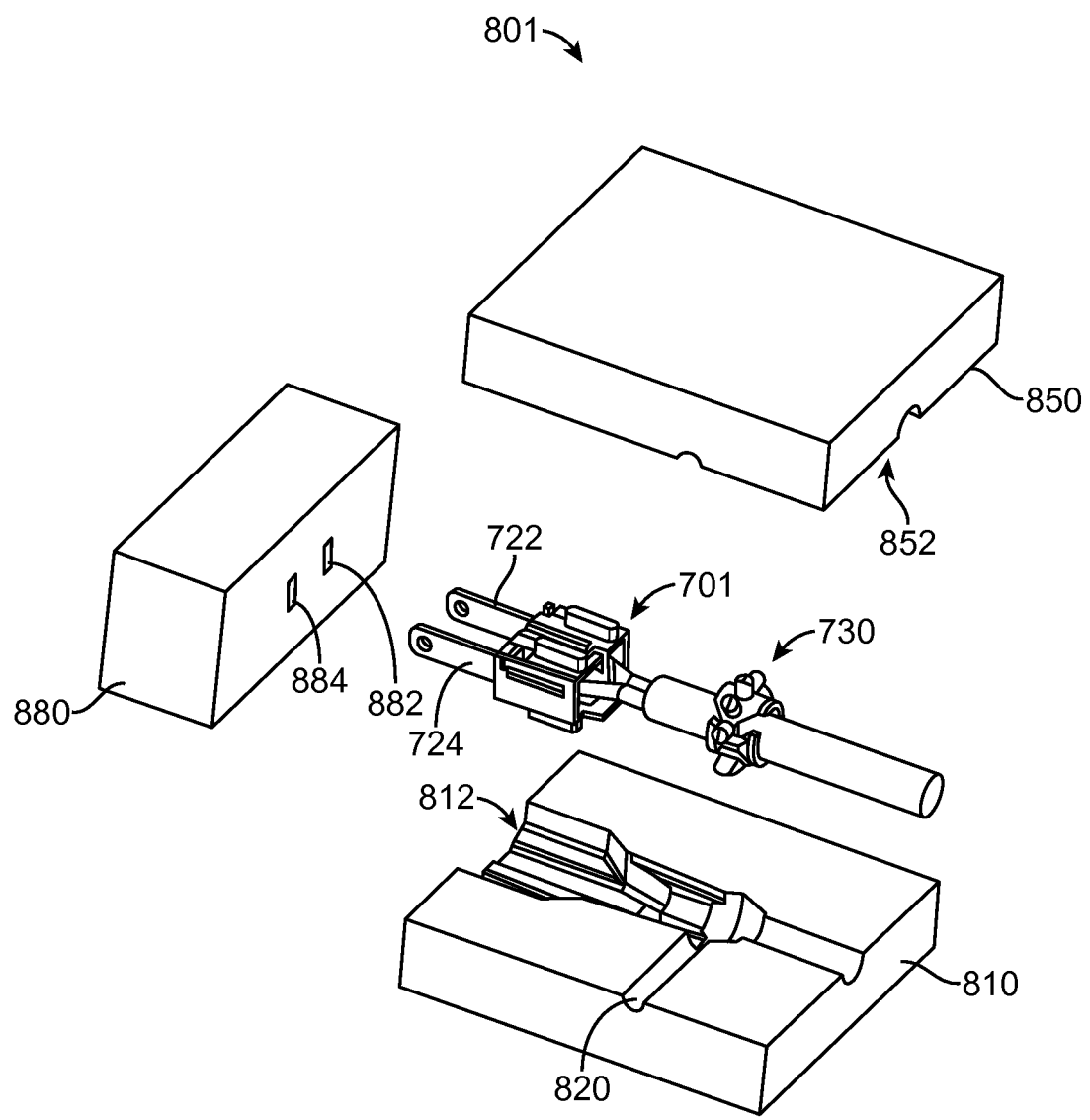
FIG. 36 is an exploded view of the inner body assembly, the strain relief, and an injection mold.

FIG. 36 is an exploded view of an injection mold 801 comprising a top mold block 850, a bottom mold block 810, and a socket mold block 880. The injection mold 801 has a mold cavity having a top mold cavity 852 in the top mold block 850 and a bottom mold cavity 812 in the bottom mold block 810 shaped to correspond to the desired shape of the overmolded electric plug with integrated strain relief 101. The bottom mold block 810 shaped to receive and detachably secure an inner body assembly 701 and a strain relief clam 730. The socket mold block 880 has first and second female connectors 884 and 882 for receiving the electrical prongs 724 and 722 of the inner wire assembly 701. The injection mold 801 has a feeder injection port 820.

Figure 37:
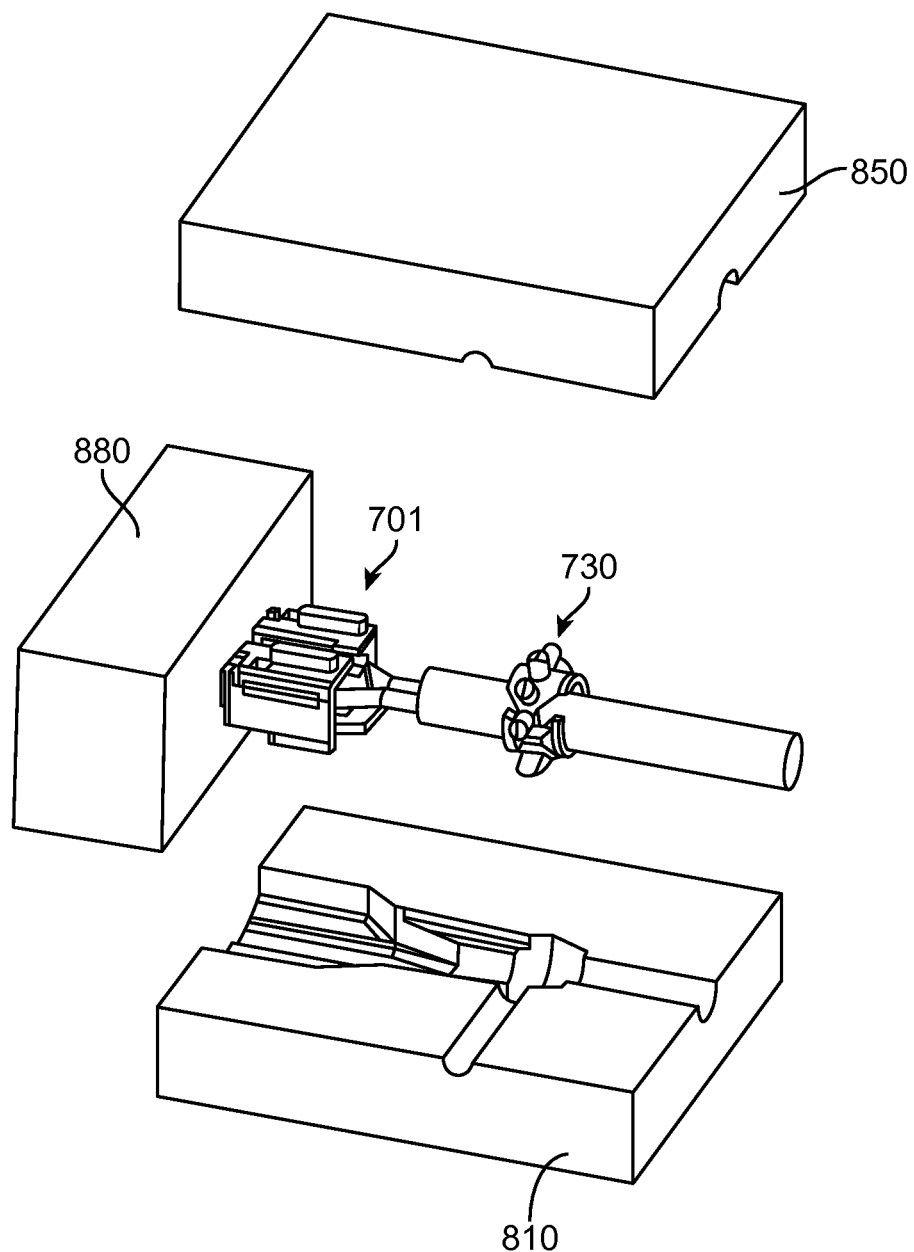
FIG. 37 is an exploded view of the inner body assembly and the strain relief where the prongs of the inner body assembly are held in a mold socket.

As seen in FIG. 37, the wire assembly 701 is plugged into the female connectors 882 and 884. The wire assembly 701 is then seated into the bottom mold block as shown in FIG. 38.

Figure 38:
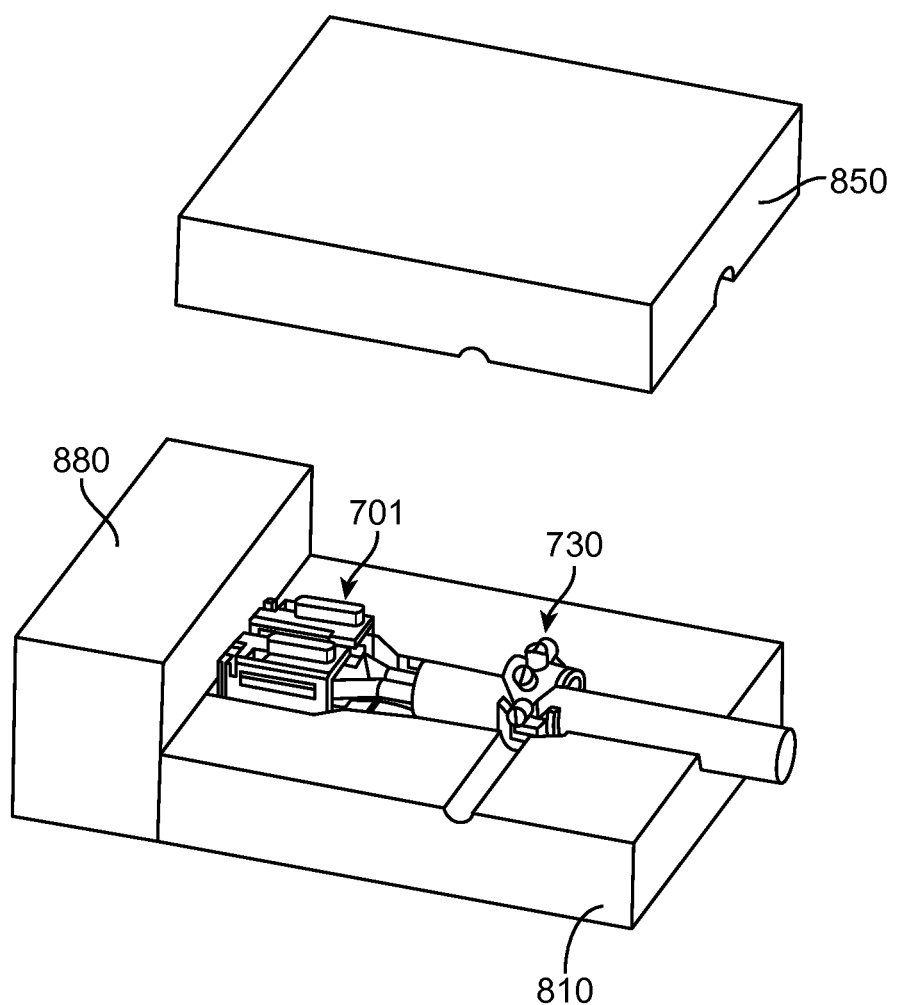
FIG. 38 is an exploded view of the inner body assembly and the strain relief placed into the bottom mold block.
Figure 39:
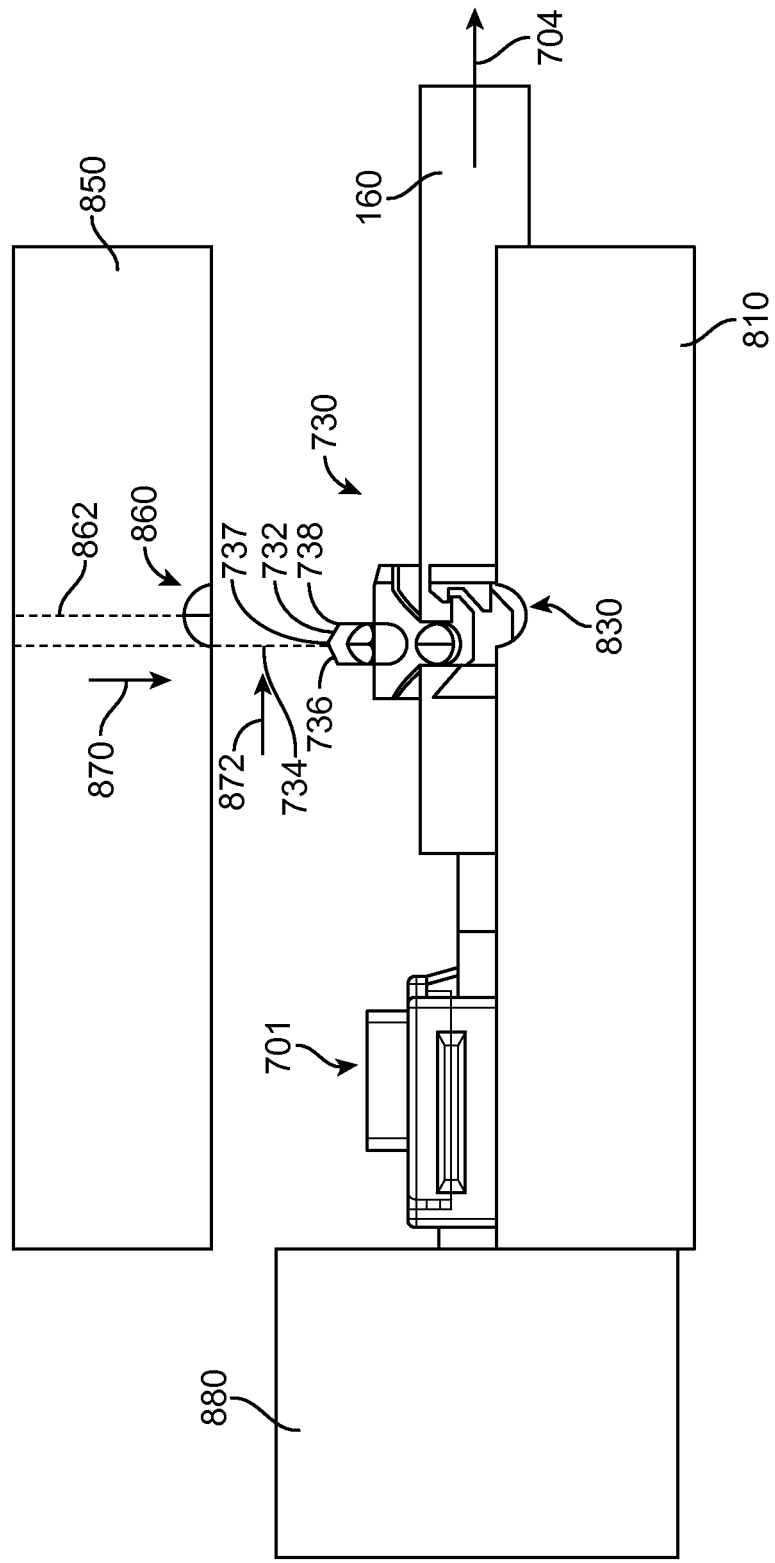
FIG. 39 is a side view of the inner body assembly and the strain relief placed into the bottom mold block showing the strain relief offset from the desired location.

FIG. 39 is a cross-sectional view of the assembly shown in FIG. 38 and illustrates features of the strain relief 730 which provide lateral and orientation self-placement during an assembly process. The protrusions 732 of the strain relief 730 as well as the top and bottom mold blocks 850 and 810 are contoured to facilitate self-alignment of the strain relief 730 within the top and bottom mold blocks 850 and 810.

Figure 40:
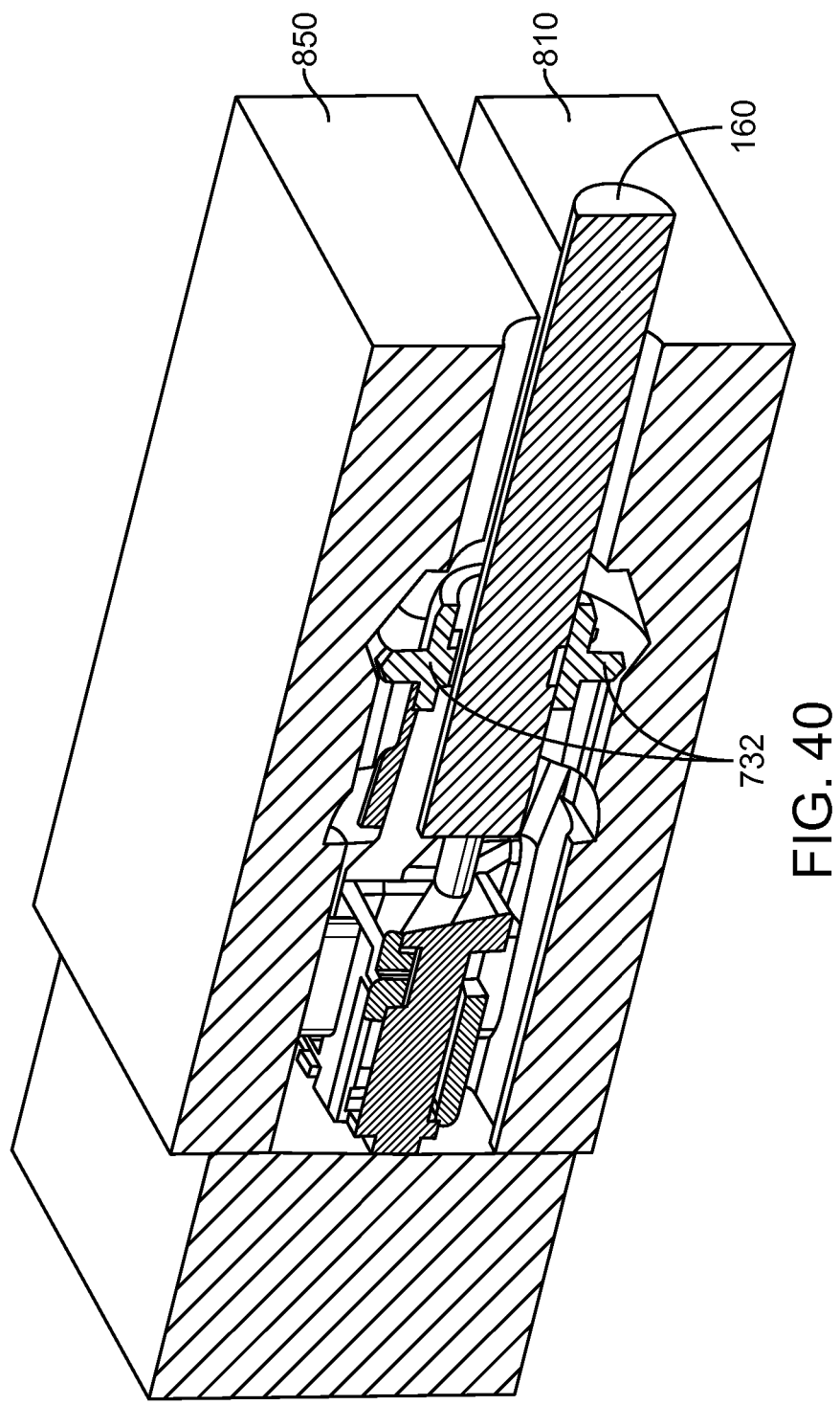
FIG. 40 is a cross-sectional view of the inner body assembly and the strain relief placed into the bottom mold block showing the strain relief offset from the desired location.

Specifically, the protrusions 732 are contoured to have a first beveled surface 736 and a second beveled surface 238 forming a ridge 737 distal to the longitudinal axis 704. In one or more embodiments, the beveled surfaces 736 and 738 may be generally flat, or they may have a curvature. In an embodiment, the top mold block 850 is contoured to have a locally contoured surface 860 and the bottom mold block 810 is contoured to have a contoured surface 830. When the top and bottom mold blocks 850 and 810 begin to close, the contoured surfaces 860 and 830 engage with the beveled surfaces 736 and 738 of the strain relief protrusions 732, the vertical force 870 is translated into lateral force 872 which shifts the strain relief 730 to the right in this example, moving from position 734 to 862. FIG. 40 presents a cross-section view of the relative positions of the strain relief 730 and the injection mold 801.

Figure 41:
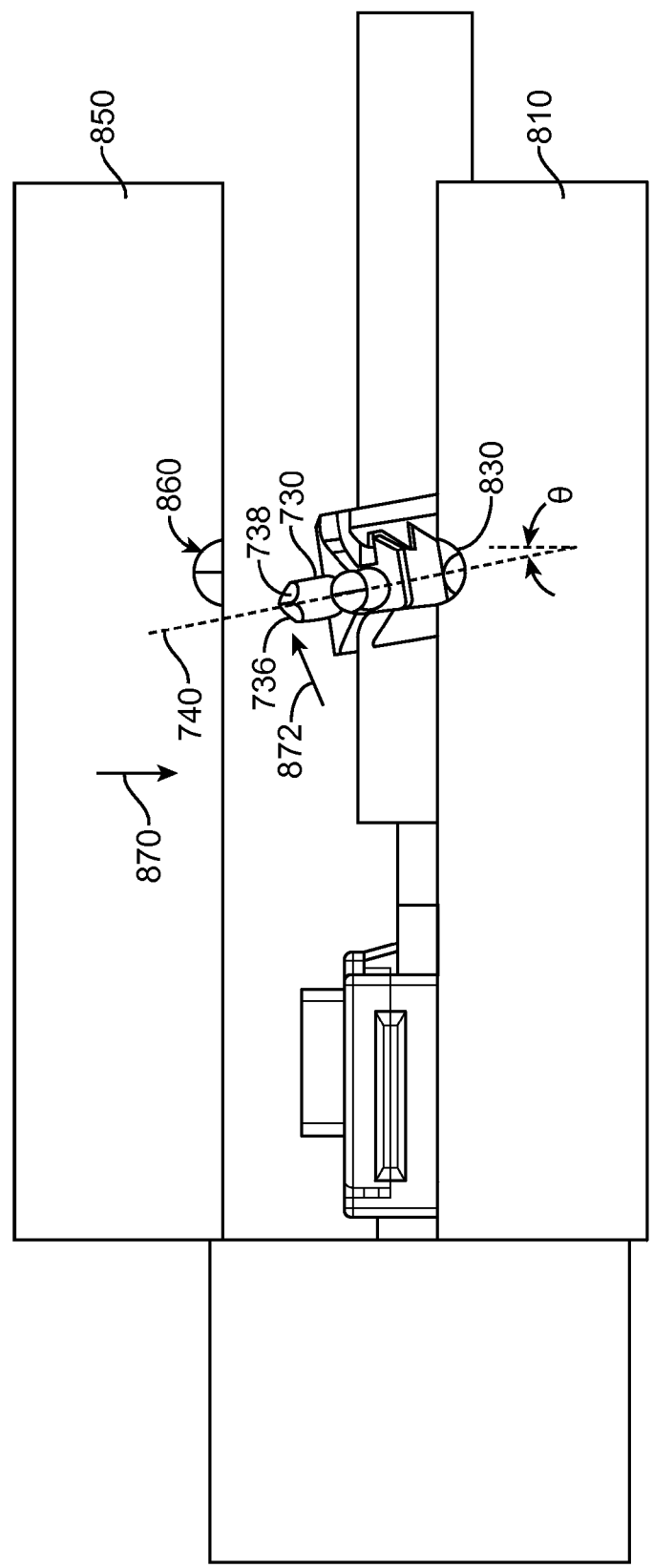
FIG. 41 is a side view of the inner body assembly and the strain relief placed into the bottom mold block showing the strain relief tilted with respect to the desired vertical orientation.
Figure 42:
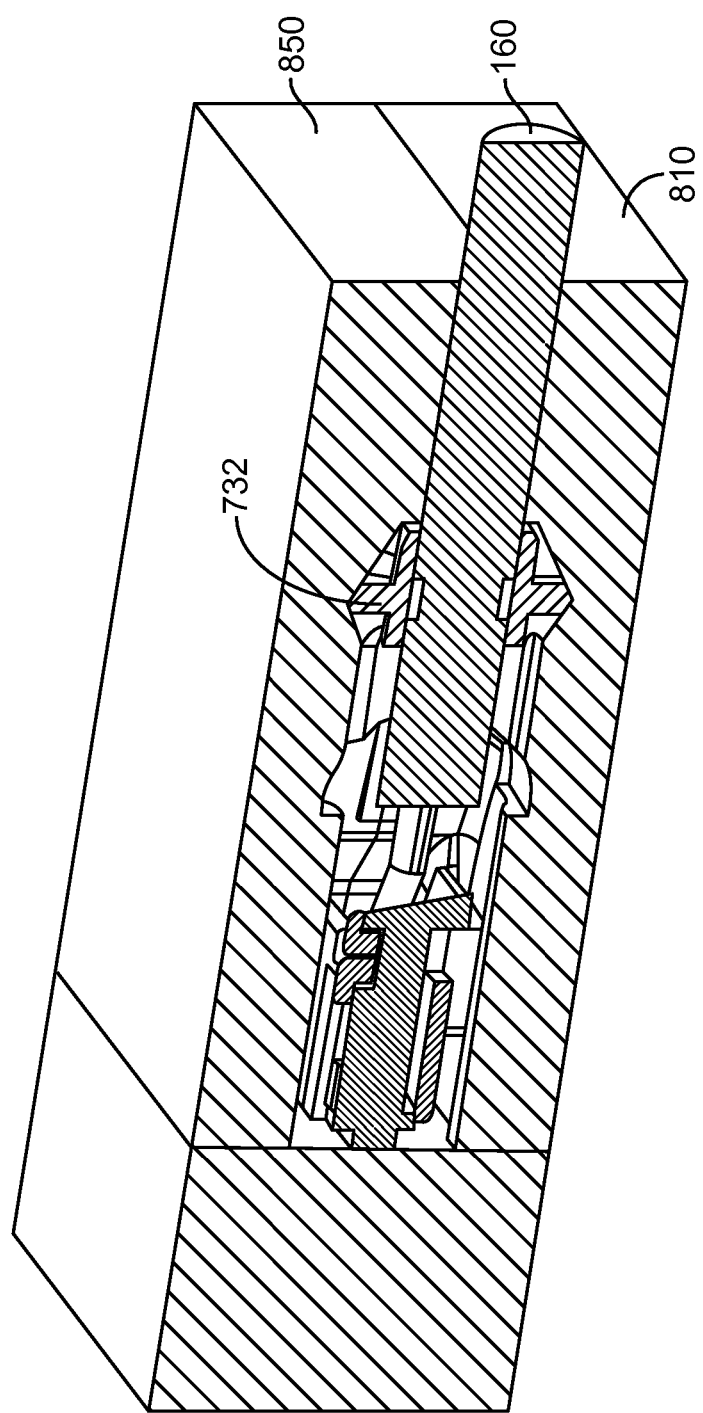
FIG. 42 is a cross-sectional view of the inner body assembly and the strain relief placed into the bottom mold block showing the strain relief positioned in the desired location and orientation.

FIG. 41 illustrates the key features of the orientation self-placement of the injection mold 801. The strain relief 730 is positioned on the bottom mold block but has an orientation angle θ relative to the vertical direction. When the top and bottom mold blocks 850 and 810 begin to close, the contoured surfaces 860 and 830 engage with the beveled surfaces 736 and 738 of the strain relief protrusions 732, the vertical force 870 is translated into lateral force 872 which shifts the strain relief 730 to the vertical position as depicted by FIG. 42.

Figure 43:
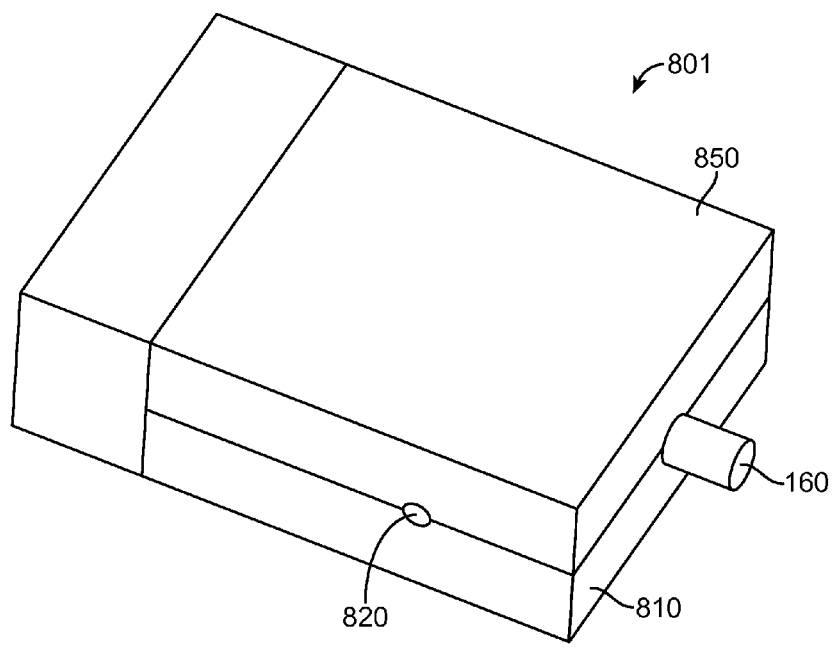
FIG. 43 is a top, perspective view of the assembled injection mold.
Figure 44:
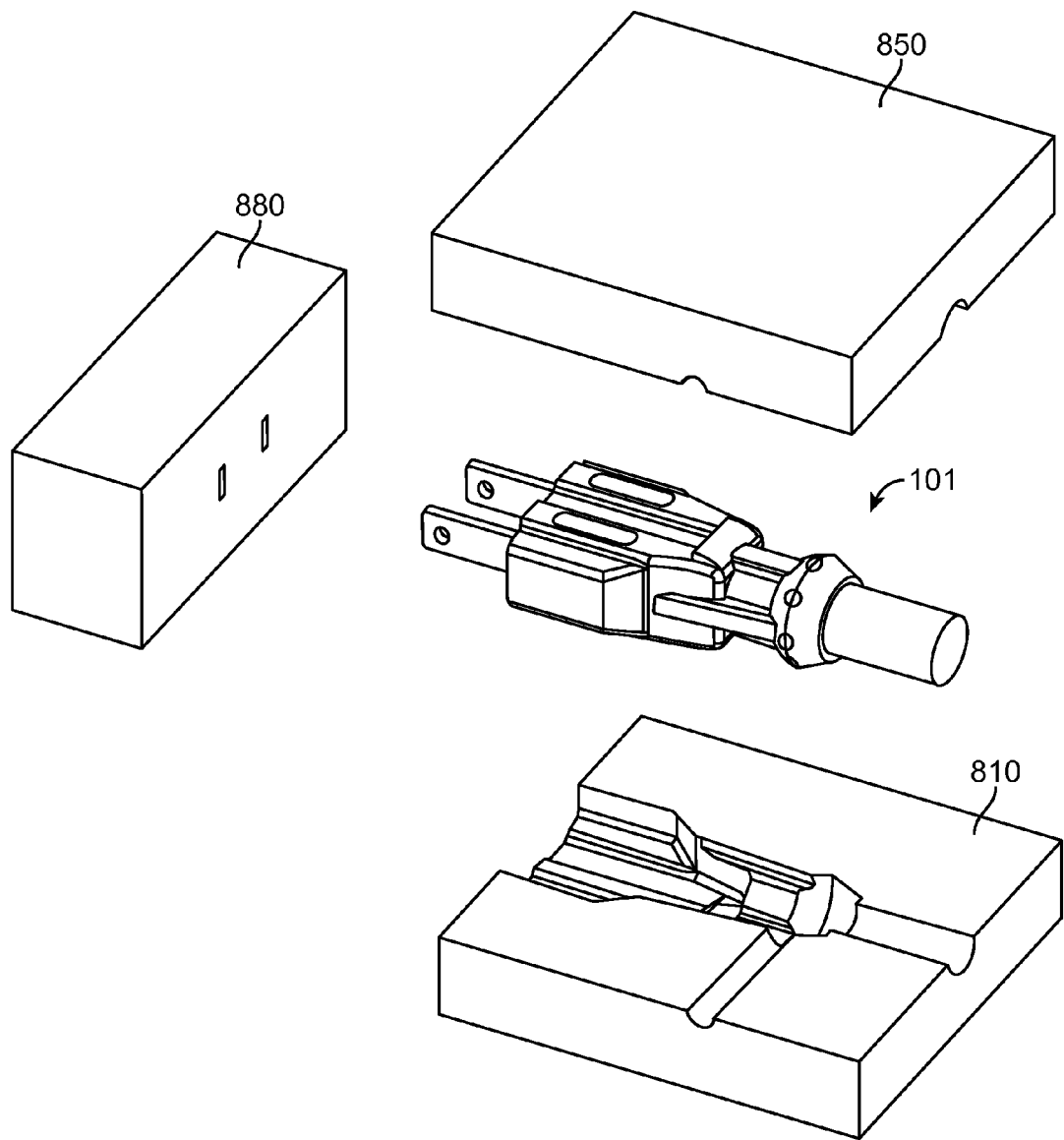
FIG. 44 is an exploded view of the overmolded electrical plug with integral strain relief separated from the injection mold.

FIG. 43 shows the assembled injection mold 801. Overmold material is injected into the injection mold feeder injection port 820. The mold cavity is shaped to receive the protrusions of the strain relief and form a seal surrounding the protrusions of the strain relief to prevent the molten material from depositing on the outer surface of the protrusions of the strain relief. As shown in FIG. 44, the top, bottom, and socket mold blocks 850, 810, and 880 are separated, and the overmolded electrical plug with integrated strain relief 101 is removed.

Figure 45:
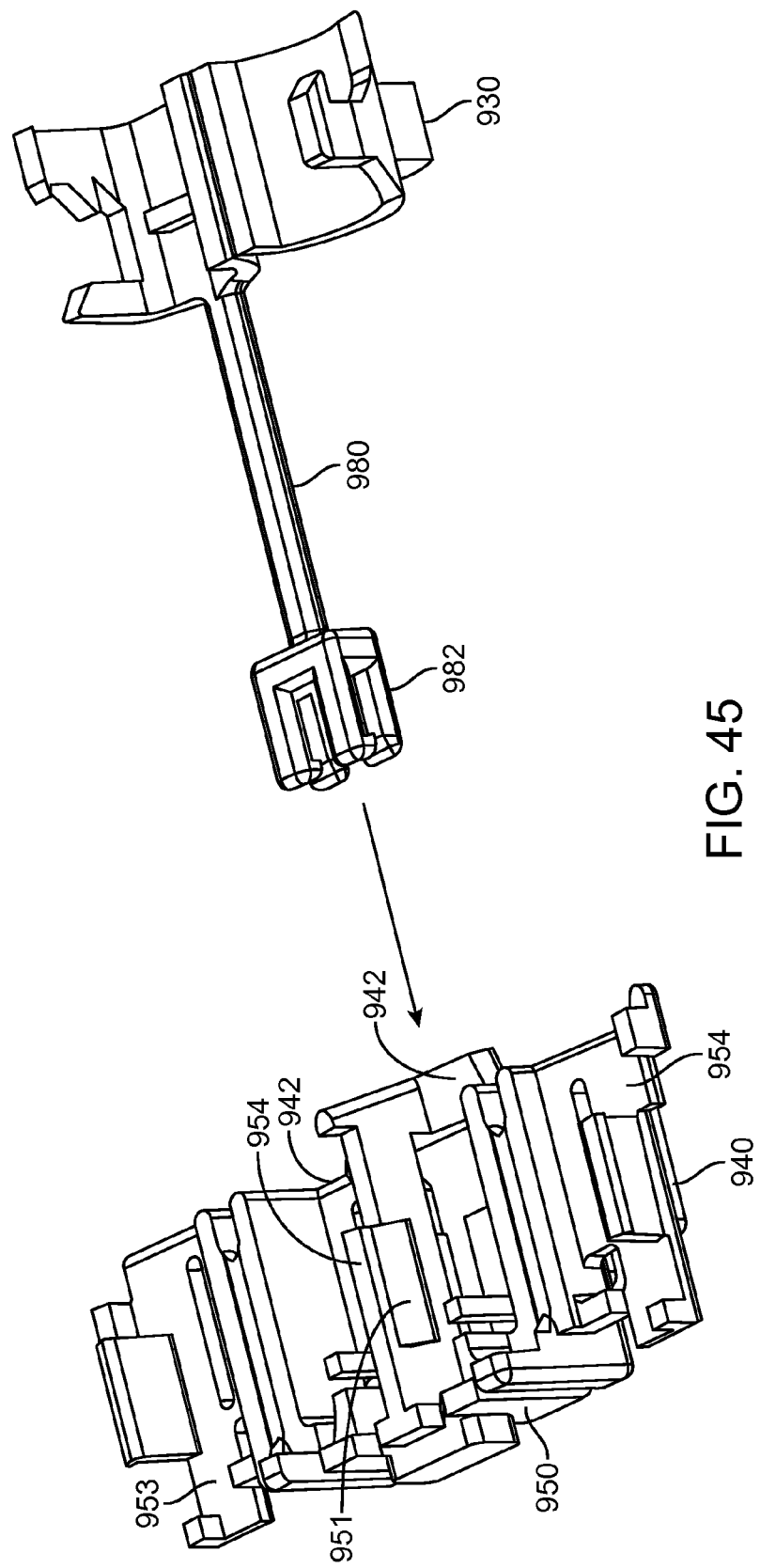
FIG. 45 is a top, perspective view of an inner body and a strain relief having a coupling arm.
Figure 46:
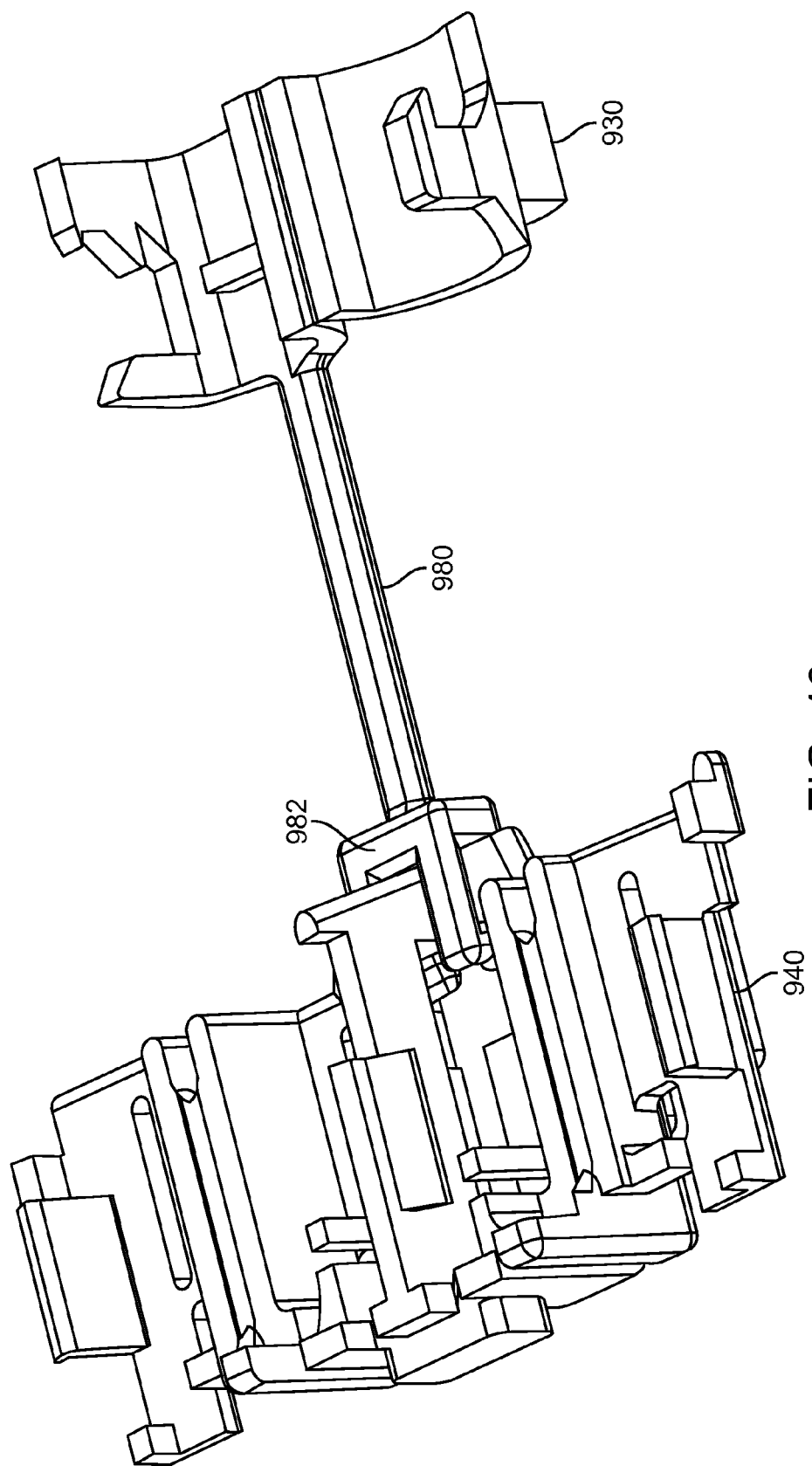
FIG. 46 is a top, perspective view of and a strain relief attaching to the inner body.

FIGS. 45-53 illustrate the assembly and process for manufacturing an electrical plug with integrated strain relief employing an internal coupling mechanism in one or more embodiments. FIG. 45 is a top, perspective view of an inner body 940, a coupling member 980, and a strain relief 930. In one or more embodiments, the coupling member 980 is integral with the strain relief 930. The coupling member 980 has a clip 982, and the inner body 940 has rails 942 which are configured to receive and couple with the clip 982 as shown in FIG. 46. The one-piece inner body 940 comprises a base 950 having one or more latching mechanisms 951 and 952, a first cover 953 hingably coupled to the base 950 on a first side of the base 950, and a second cover 954 hingably coupled to the base 950 on a second side of the base 950, the second side of the base opposite that of the first side of the base.

Figure 47:
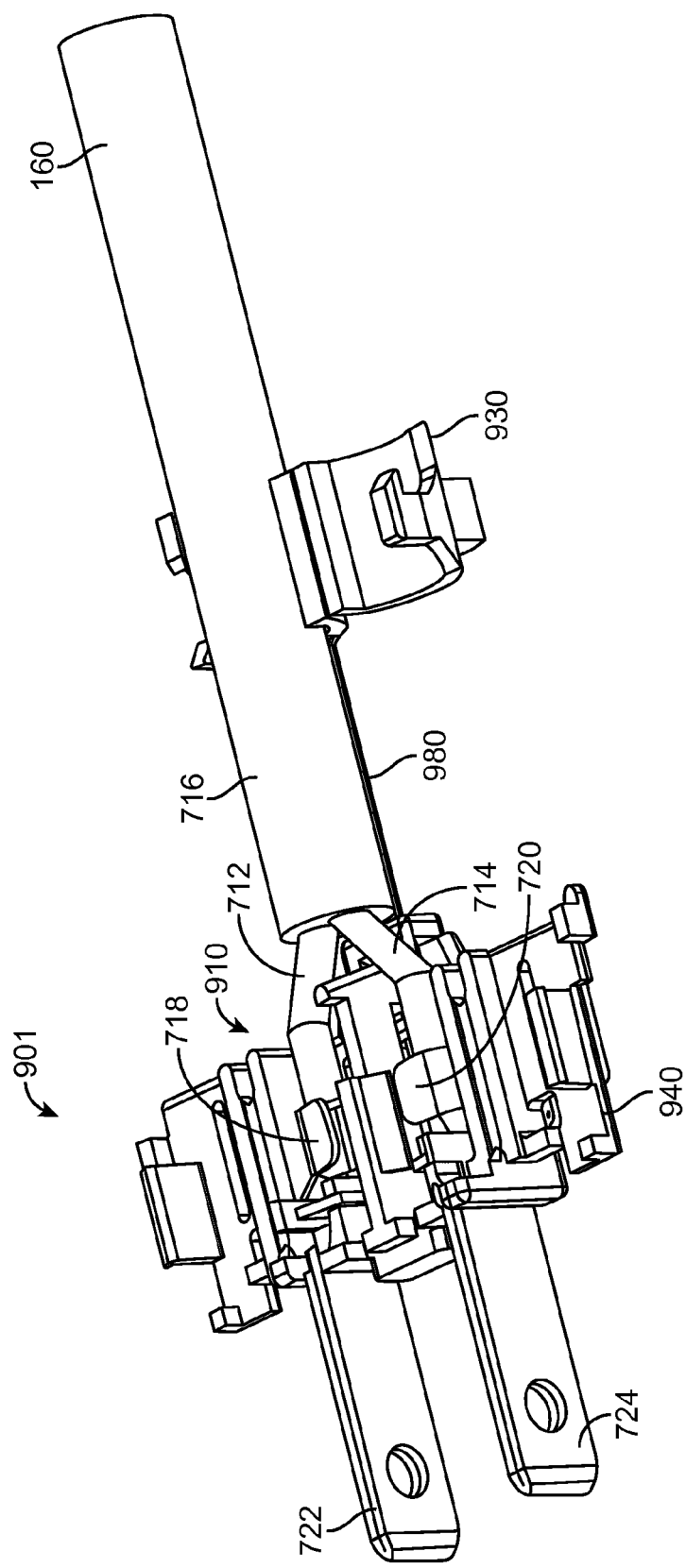
FIG. 47 is a top, perspective view of wire assembly placed into the inner body and the strain relief.

As depicted in FIG. 47, the wire assembly is placed in the inner body 940 to form an inner body assembly 901. The electrical power cord 160 of the inner body assembly 901 is placed in the strain relief 930. The wire assembly 910 comprises an electrical power cord 160 having at least two wires 712 and 714 enclosed within an insulating cable jacket 716. The wire assembly further comprising at least two electrical connectors 718 and 720 each electrical connector having an electrical prong 722 and 724, the electrical connectors connected to a corresponding wire forming at least two electric power lines. The inner body 940 secures and essentially surrounds the electrical connectors and a portion of the wire proximal to the electrical connectors.

Figure 48:
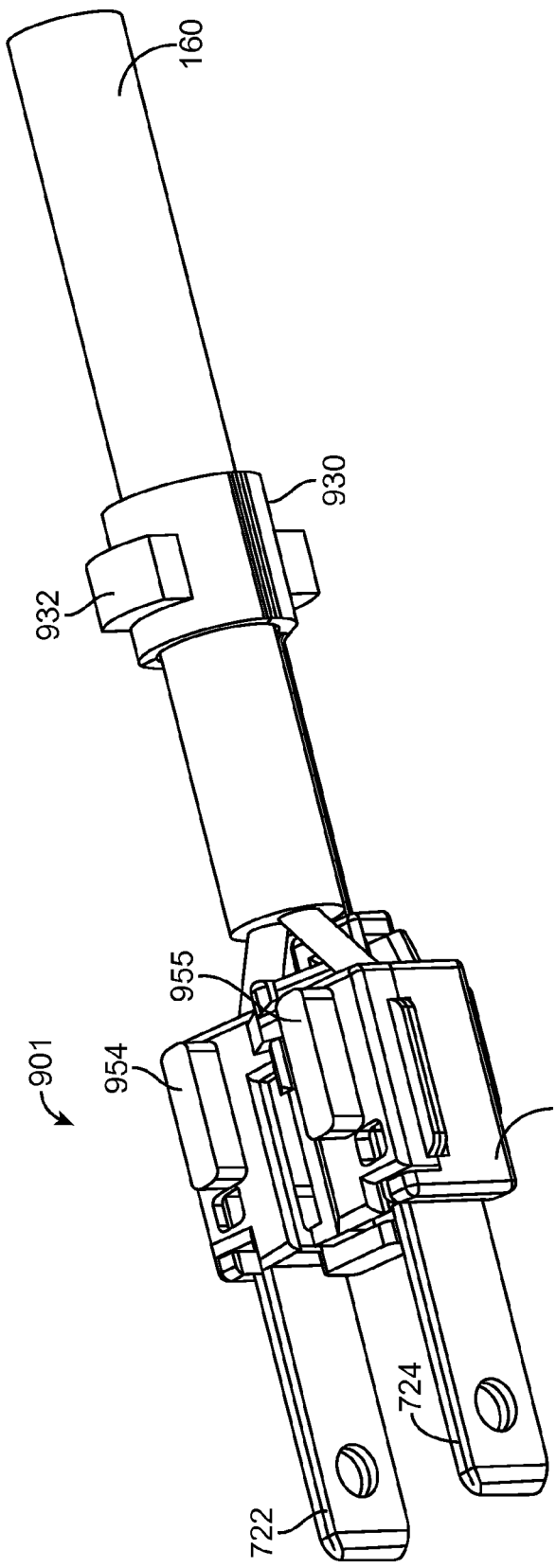
FIG. 48 is a side, perspective view of a strain relief surrounding the electrical power cord in a pre-locked configuration.
Figure 49:
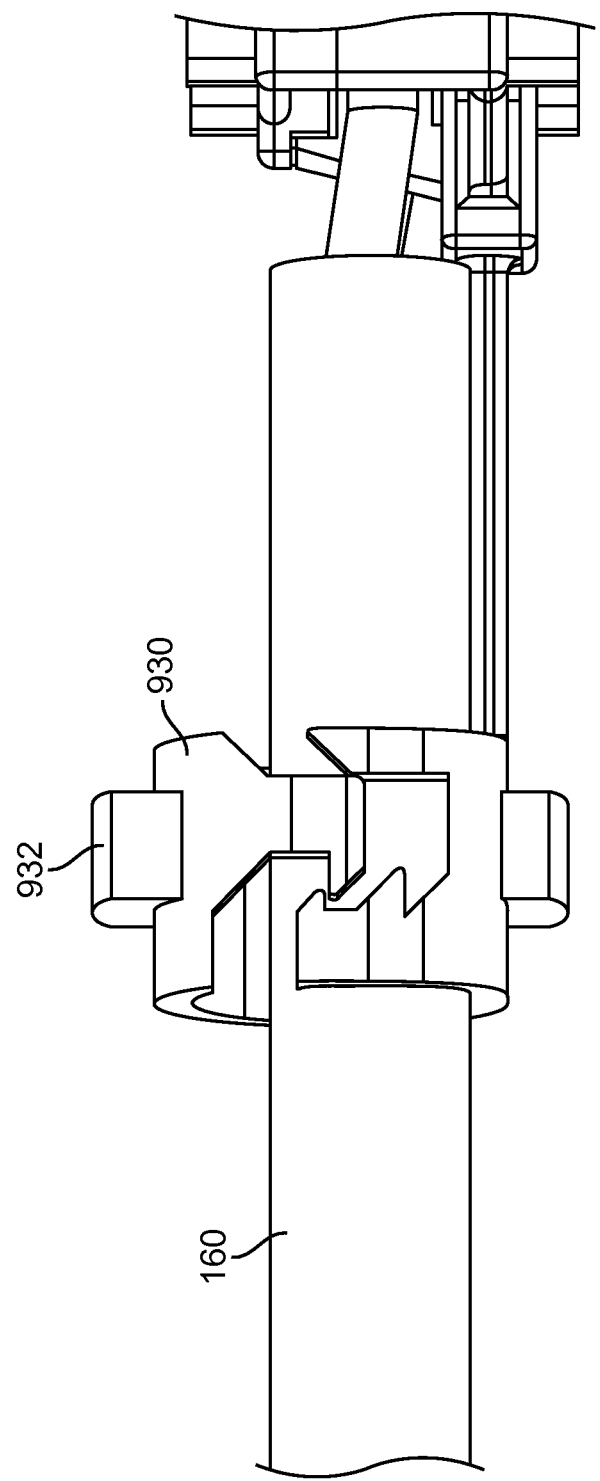
FIG. 49 is a side, perspective view showing details of the strain relief surrounding the electrical power cord in a pre-locked configuration.

Referring to FIGS. 48 and 49, the two sections of the strain relief 930 are coupled together as discussed above, and placed in pre-locked position around the electrical power cord 160. The strain relief 930 has several protrusions 932. The inner body 940 has one or more inner body protrusions 954 and 955 projecting outward and away from the inner body 940. In an embodiment, the inner body protrusions 954 and 955 are shaped to indicate an orientation.

Figure 50:
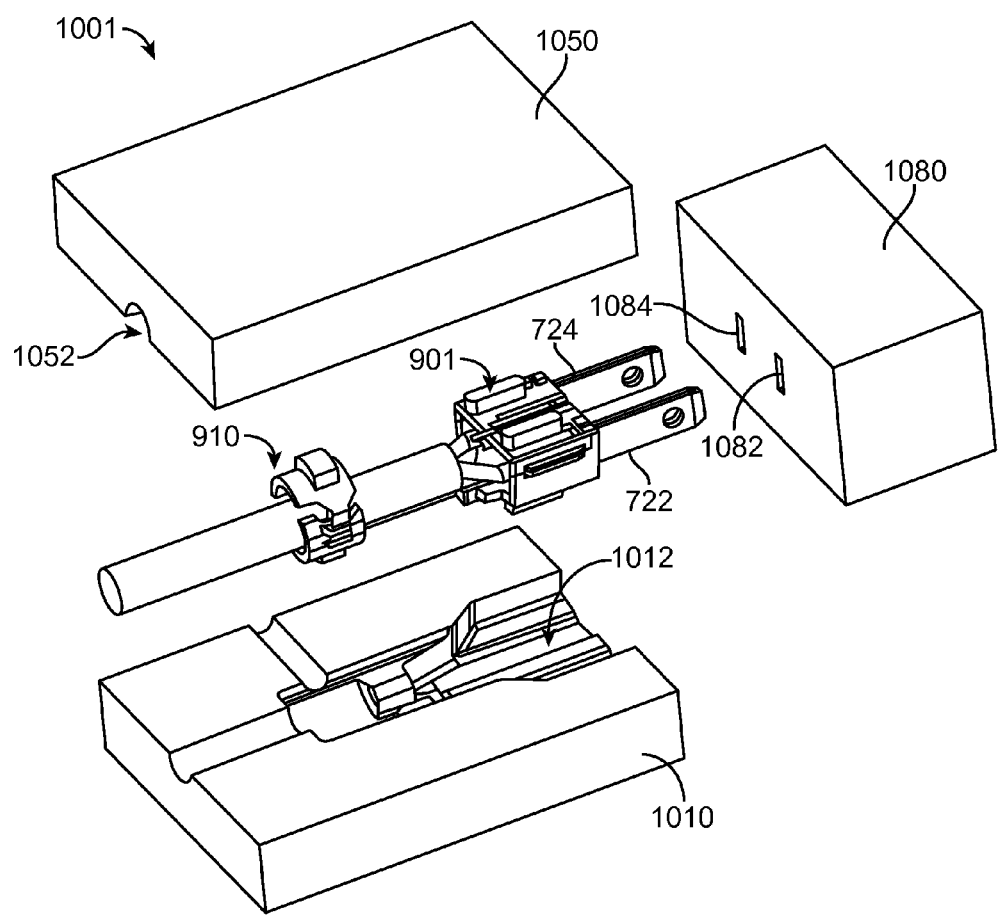
FIG. 50 is an exploded view of the inner body assembly, the strain relief, and an injection mold.
Figure 53:
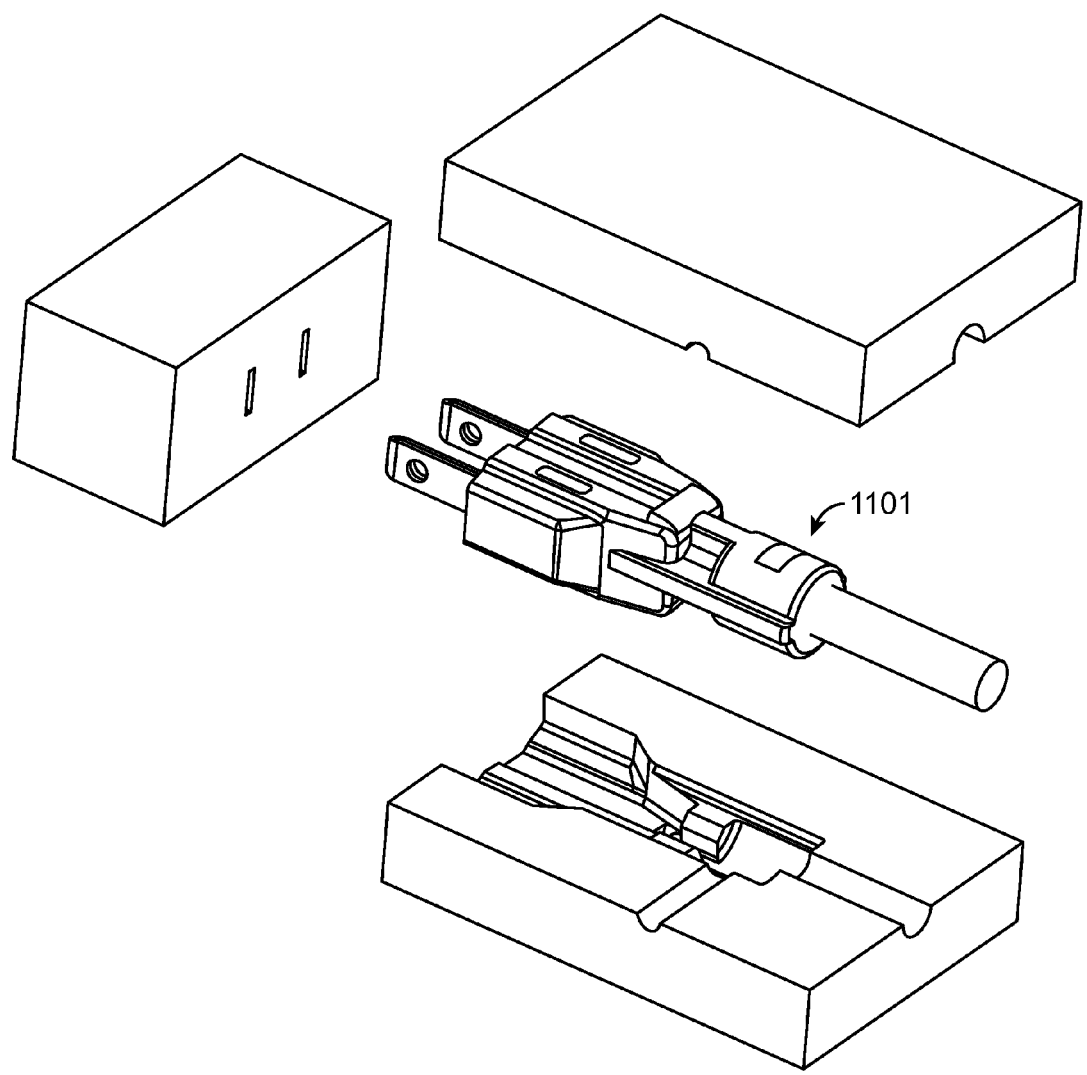
FIG. 53 is an exploded view of the overmolded electrical plug with integral strain relief separated from the injection mold.

FIG. 50 is an exploded view of an injection mold 1001 comprising a top mold block 1050, a bottom mold block 1010, and a socket mold block 1080. The injection mold 1001 has a mold cavity having a top mold cavity 1052 in the top mold block 1050 and a bottom mold cavity 1012 in the bottom mold block 1010 shaped to correspond to the desired shape of the overmolded electric plug with integrated strain relief 1101 as shown in FIG. 53. The bottom mold block 1010 shaped to receive and detachably secure an inner body assembly 901 and a strain relief clam 930. The socket mold block 880 has first and second female connectors 1084 and 1082 for receiving the electrical prongs 724 and 722 of the inner wire assembly 901.

Figure 51:
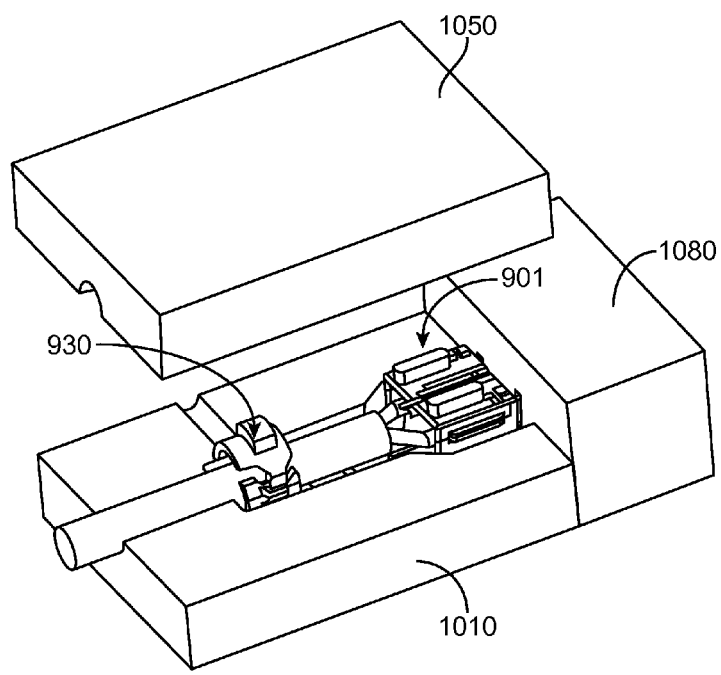
FIG. 51 is an exploded view of the inner body assembly and the strain relief placed into the bottom mold block.
Figure 52:
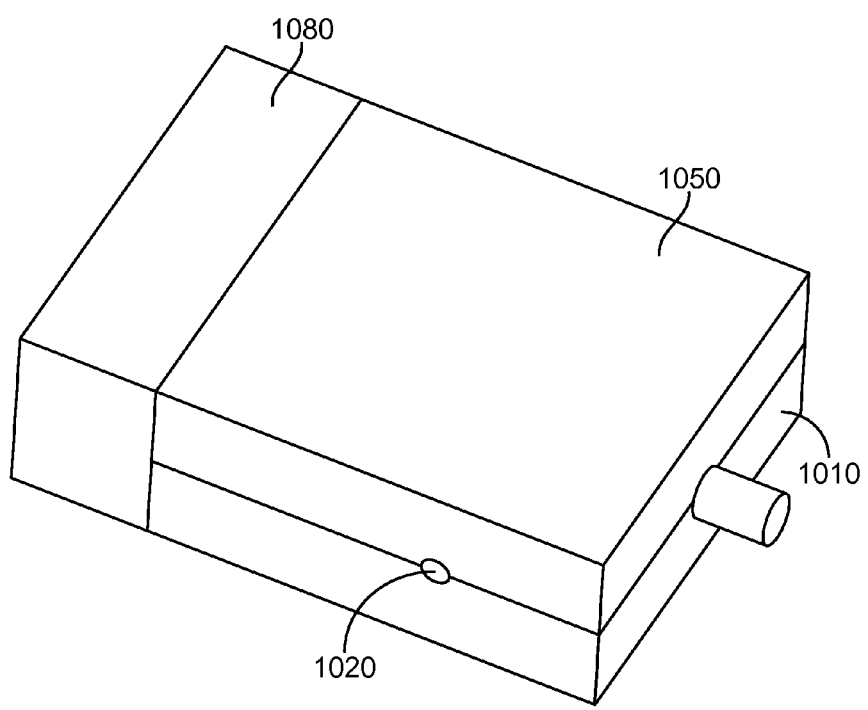
FIG. 52 is a top, perspective view of the assembled injection mold.

Referring to FIG. 51, the electrical prongs 724 and 722 are plugged into the female connectors 1084 and 182. The inner body assembly 901 and the strain relief are placed into the bottom mold block 1010. As depicted in FIG. 52, the top mold block 1050 is placed over the bottom mold block 1010, and overmold material is injected into the injection mold feeder injection port 1020. As shown in FIG. 53, the top, bottom, and socket mold blocks 1050, 1010, and 1080 are separated, and the overmolded electrical plug with integrated strain relief 1101 is removed.

Figure 54:
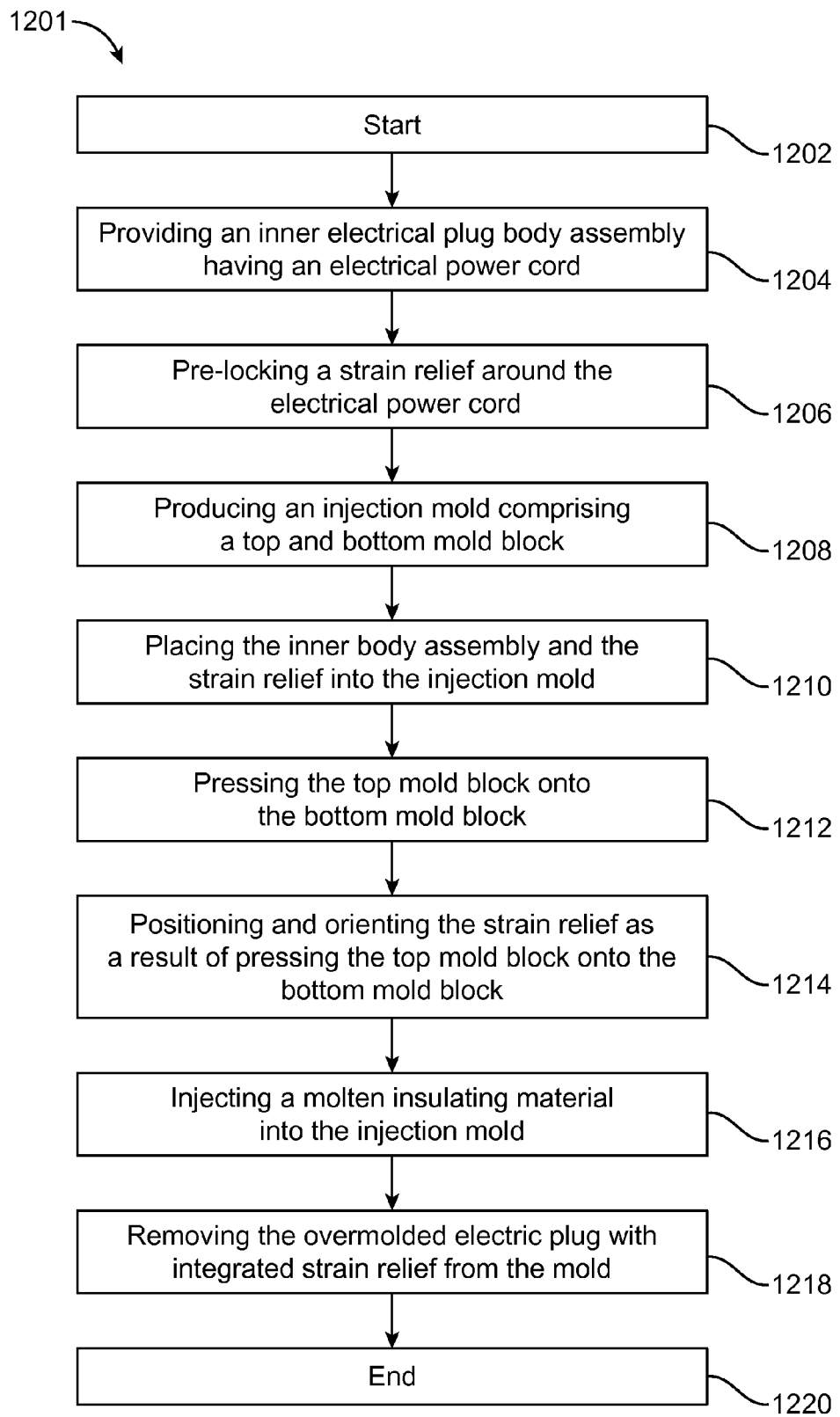
FIG. 54 illustrates a process for manufacturing an overmolded electrical plug with integrated strain relief.

FIG. 54 presents an exemplary process 1201 for manufacturing an overmolded electrical plug with integrated strain relief 101. The process begins at step 1202. An inner electrical plug body assembly having an electrical power cord is provided (step 1204). A strain relief is pre-locked around the electrical power cord (step 1206). An injection mold comprising a top and bottom mold block is produced (step 1208). The inner body assembly and the strain relief are placed into the injection mold (step 1210). The top mold block is pressed onto the bottom mold block (step 1212). The strain relief is positioned and orientated as a result of pressing the top mold block onto the bottom mold block (step 1214). A molten insulating material is injected into the injection mold (step 1216). The overmolded electric plug with integrated strain relief is removed from the mold (step 1218) and the process ends (steps 1220).

Figure 55:
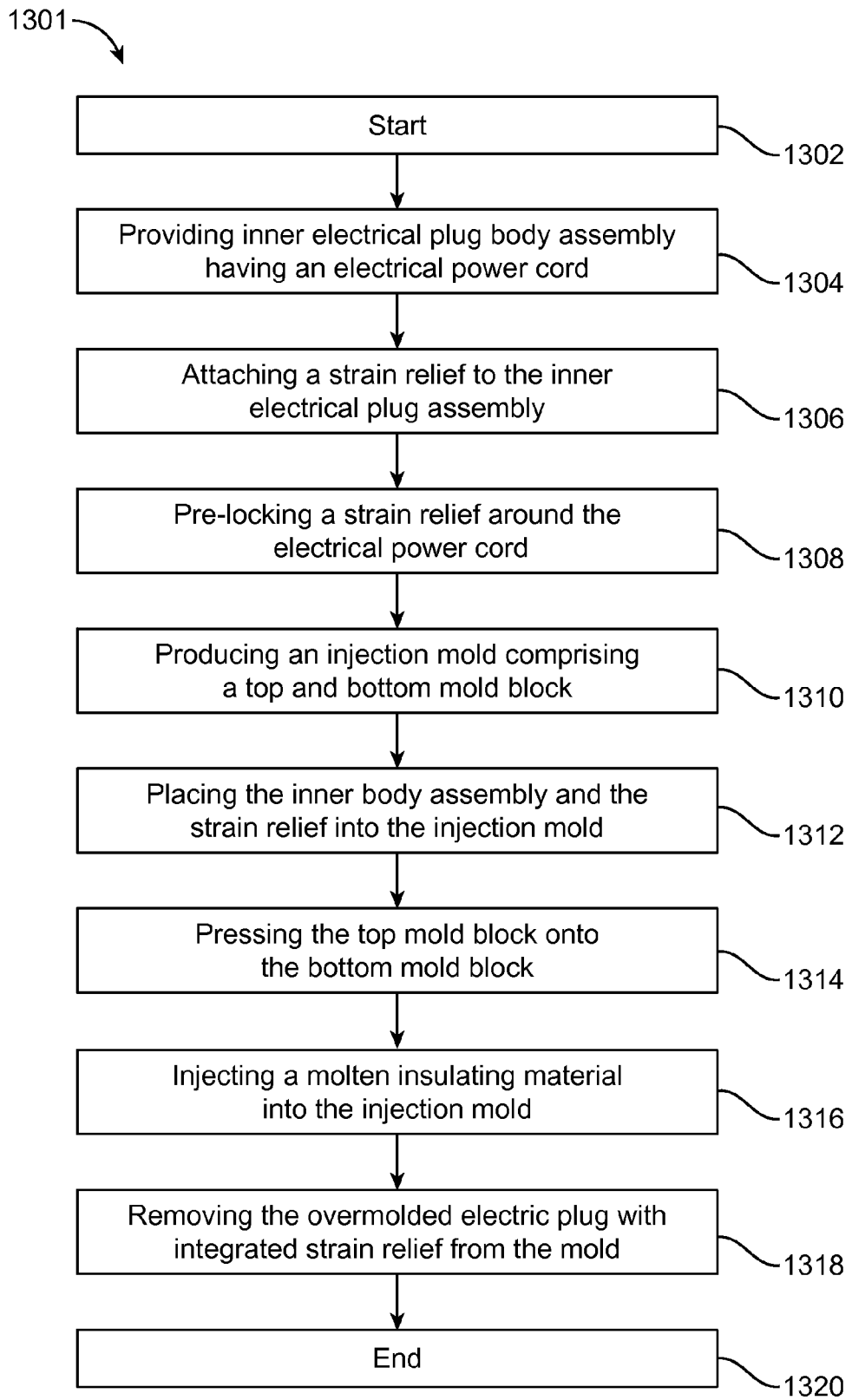
FIG. 55 illustrates a process for manufacturing an overmolded electrical plug with integrated strain relief coupled internally to the inner body.

FIG. 55 presents an exemplary process 1301 for manufacturing an overmolded electrical plug with integrated strain relief 1101. The process begins at 1302. An inner electrical plug body assembly having an electrical power cord is provided (step 1304). A strain relief is attached to the inner electrical plug assembly (step 1306). A strain relief is pre-locked around the electrical power cord (step 1308). An injection mold comprising a top and bottom mold block is produced (step 1310). The inner body assembly and the strain relief are placed into the injection mold (step 1312). The top mold block is pressed onto the bottom mold block (step 1314). A molten insulating material is injected into the injection mold (step 1316). The overmolded electric plug with integrated strain relief is removed from the mold (step 1318), and the process ends (step 1320).

Although the invention has been discussed with reference to specific embodiments, it is apparent and should be understood that the concept can be otherwise embodied to achieve the advantages discussed. The preferred embodiments above have been described primarily as electrical plugs with integrated strain relief. In this regard, the foregoing description of the electrical plugs with integrated strain relief is presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for manufacturing an overmolded electric plug with integrated strain relief, comprising:
   producing an inner body assembly comprising a wire assembly and an inner body, the wire assembly comprising an electrical power cord and electrical connectors, the inner body securing the electrical connectors;
   placing a strain relief around the electrical power cord, the strain relief having an outer surface having a plurality of protrusions extending radially away from the electrical power cord;
   producing an injection mold comprising a top mold block, a bottom mold block, and a socket mold block, the injection mold having a mold cavity shaped to correspond to the desired shape of the overmolded electric plug with integrated strain relief, the bottom mold block shaped to receive and detachably secure the inner body assembly and a strain relief, the socket mold block having socket connectors configured to receive the electrical connectors, the injection mold having a feeder injection port;
   coupling the electrical connectors to the socket connectors of the socket mold block placing the inner body assembly and the strain relief into the bottom mold;
   pressing the top mold block onto the bottom mold block;
   injecting a molten insulating material into the injection mold through the feeder injection port; and,
   removing the overmolded electric plug from the injection mold,
   wherein the mold cavity is shaped to receive the protrusions of the strain relief and form a seal surrounding the protrusions of the strain relief to prevent the molten insulating material from depositing on the outer surface of the protrusions of the strain relief.

2. The method for manufacturing an overmolded electric plug with integrated strain relief of claim 1, wherein placing a strain relief around the electrical power cord comprises pre-locking the strain relief around the electrical power cord, wherein the strain relief in the pre-locked configuration is able to move laterally about the electrical power cord.

3. The method for manufacturing an overmolded electric plug with integrated strain relief of claim 2 wherein pressing the top mold block onto the bottom mold block further comprising pressing the strain relief into a locked configuration, wherein the strain relief is securely engaged to the electrical power cord in the locked configuration.

4. The method for manufacturing an overmolded electric plug with integrated strain relief of claim 3, wherein pressing the strain relief into a locked configuration comprises engaging one portion of the strain relief into a second portion of the strain relief in a direction perpendicular to a length of the electrical power cord.

5. The method for manufacturing an overmolded electric plug with integrated strain relief of claim 3, wherein pressing the strain relief into a locked configuration comprises engaging one portion of the staring relief into a second portion of the strain relief in a direction parallel to a length of the electrical power cord.

6. The method for manufacturing an overmolded electric plug with integrated strain relief of claim 1, wherein:
   the protrusions of the strain relief are contoured having a first and a second beveled surface forming a ridge distal to the electrical power cord, and
   the mold cavity is shaped to receive the protrusions of the strain relief and form a contact with the first and the second beveled surfaces, wherein when the top mold block is pressed toward the second mold block, the section of the mold cavity mold cavity adjacent to the first and second beveled surfaces urge the strain relief to move laterally along the electrical power cord to a desire location.

7. The method for manufacturing an overmolded electric plug with integrated strain relief of claim 1, wherein:
   the protrusions of the strain relief are contoured having a first and a second beveled surface forming a ridge distal to the electrical power cord, and
   the mold cavity is shaped to receive the protrusions of the strain relief and form a contact with the first and the second beveled surfaces, wherein when the top mold block is pressed toward the second mold block, the section of the mold cavity mold cavity adjacent to the first and second beveled surfaces urge the strain relief to move along the electrical power cord to a desired angular orientation.

8. The method for manufacturing an overmolded electric plug with integrated strain relief of claim 1, wherein:
   the inner body assembly further comprises one or more inner body protrusions projecting outward and away from the top of the inner body assembly; and,
   the upper mold block is shaped to receive the inner body protrusions and form a seal surrounding the inner body protrusions to prevent the molten material from depositing on the top surface of the inner body protrusions.

9. The method for manufacturing an overmolded electric plug with integrated strain relief of claim 1, wherein the inner body comprises inner body protrusions indicating orientation.

10. A method for manufacturing an overmolded electric plug with integrated strain relief, comprising:
    producing an inner body assembly comprising a wire assembly and an inner body, the wire assembly comprising an electrical power cord and electrical connectors, the inner body securing the electrical connectors;
    placing a strain relief around the electrical power cord, the strain relief having an outer surface having a plurality of protrusions extending radially away from the electrical power cord, the strain relief having a coupling member extending away from the strain relief;
    connecting the coupling member of the strain relief to the inner body assembly;
    producing an injection mold comprising a top mold block, a bottom mold block, and a socket mold block, the injection mold having a mold cavity shaped to correspond to the desired shape of the overmolded electric plug with integrated strain relief, the bottom mold block shaped to receive and detachably secure an inner body assembly and a strain relief, the socket mold block having socket connectors configured to receive the electrical connectors, the injection mold having a feeder injection port;
    coupling the electrical connectors to the socket connectors of the socket mold block;
    placing the inner body assembly and the strain relief into the bottom mold;
    pressing the top mold block onto the bottom mold block;
    injecting a molten insulating material into the injection mold through the feeder injection port, the injected molten material urging air within the mold to vent via multiple air escape paths; and,
    removing the overmolded electric plug from the mold,
    wherein the mold cavity is shaped to receive the protrusions of the strain relief and form a seal surrounding the protrusions of the strain relief to prevent the molten material from depositing on the outer surface of the protrusions of the strain relief.

11. The method for manufacturing an overmolded electric plug with integrated strain relief of claim 10, wherein placing a strain relief around the electrical power cord comprises pre-locking the strain relief around the electrical power cord.

12. The method for manufacturing an overmolded electric plug with integrated strain relief of claim 11 wherein pressing the top mold block onto the bottom mold block further comprising pressing the strain relief into a locked configuration, wherein the strain relief is securely engaged to the electrical power cord in the locked configuration.

13. The method for manufacturing an overmolded electric plug with integrated strain relief of claim 12, wherein pressing the strain relief into a locked configuration comprises engaging one portion of the staring relief into a second portion of the strain relief in a direction perpendicular to a length of the electrical power cord.

14. The method for manufacturing an overmolded electric plug with integrated strain relief of claim 12, wherein pressing the strain relief into a locked configuration comprises engaging one portion of the staring relief into a second portion of the strain relief in a direction parallel to a length of the electrical power cord.

15. A method for manufacturing an overmolded electric plug with integrated strain relief, comprising:
producing an inner body assembly comprising a wire assembly and an inner body, the wire assembly comprising an electrical power cord and electrical connectors, the inner body securing the electrical connectors;
placing a strain relief around the electrical power cord, the strain relief having a plurality of protrusions extending radially away from the electrical power cord, the strain relief having a coupling member extending away from the strain relief;
connecting the coupling member of the strain relief to the inner body assembly;
producing an injection mold comprising a top mold block, a bottom mold block, and a socket mold block, the injection mold having a mold cavity shaped to correspond to the desired shape of the overmolded electric plug with integrated strain relief, the bottom mold block shaped to receive and detachably secure an inner body assembly and a strain relief, the socket mold block having socket connectors configured to receive the electrical connectors, the injection mold having a feeder injection port;
coupling the electrical connectors to the socket connectors of the socket mold block;
placing the inner body assembly and the strain relief into the bottom mold;
pressing the top mold block onto the bottom mold block;
injecting a molten insulating material into the injection mold through the feeder injection port, the injected molten material urging air within the mold to vent via multiple air escape paths; and,
removing the overmolded electric plug from the mold, wherein:
the inner body assembly further comprises one or more inner body protrusions projecting outward and away from the top of the inner body assembly; and,
the upper mold block is shaped to receive the inner body protrusions and form a seal surrounding the inner body protrusions to prevent the molten material from depositing on the top surface of the inner body protrusions.

16. A method for manufacturing an overmolded electric plug with integrated strain relief, comprising:
producing an inner body assembly comprising a wire assembly and an inner body, the wire assembly comprising an electrical power cord and electrical connectors, the inner body securing the electrical connectors;
placing a strain relief around the electrical power cord, the strain relief having a plurality of protrusions extending radially away from the electrical power cord, the strain relief having a coupling member extending away from the strain relief;
connecting the coupling member of the strain relief to the inner body assembly;
producing an injection mold comprising a top mold block, a bottom mold block, and a socket mold block, the injection mold having a mold cavity shaped to correspond to the desired shape of the overmolded electric plug with integrated strain relief, the bottom mold block shaped to receive and detachably secure an inner body assembly and a strain relief, the socket mold block having socket connectors configured to receive the electrical connectors, the injection mold having a feeder injection port;
coupling the electrical connectors to the socket connectors of the socket mold block;
placing the inner body assembly and the strain relief into the bottom mold;
pressing the top mold block onto the bottom mold block;
injecting a molten insulating material into the injection mold through the feeder injection port, the injected molten material urging air within the mold to vent via multiple air escape paths; and,
removing the overmolded electric plug from the mold,
wherein the inner body comprises inner body protrusions indicating orientation.

17. A method for manufacturing an overmolded electric plug with integrated strain relief, comprising:
producing an inner body assembly comprising a wire assembly and an inner body, the wire assembly comprising an electrical power cord and electrical connectors, the inner body securing the electrical connectors;
placing a strain relief around the electrical power cord, the strain relief having plurality of protrusions extending radially away from the electrical power cord;
producing an injection mold comprising a top mold block, a bottom mold block, and a socket mold block, the injection mold having a mold cavity shaped to correspond to the desired shape of the overmolded electric plug with integrated strain relief, the bottom mold block shaped to receive and detachably secure the inner body assembly and a strain relief, the socket mold block having socket connectors configured to receive the electrical connectors, the injection mold having a feeder injection port;
coupling the electrical connectors to the socket connectors of the socket mold block placing the inner body assembly and the strain relief into the bottom mold;
pressing the top mold block onto the bottom mold block;
injecting a molten insulating material into the injection mold through the feeder injection port; and,
removing the overmolded electric plug from the injection mold,
wherein:
the protrusions of the strain relief are contoured having a first and a second beveled surface forming a ridge distal to the electrical power cord, and the mold cavity is shaped to receive the protrusions of the strain relief and form a contact with the first and the second beveled surfaces, wherein when the top mold block is pressed toward the second mold block, the section of the mold cavity mold cavity adjacent to the first and second beveled surfaces urge the strain relief to move laterally along the electrical power cord to a desire location.

18. A method for manufacturing an overmolded electric plug with integrated strain relief, comprising:
producing an inner body assembly comprising a wire assembly and an inner body, the wire assembly comprising an electrical power cord and electrical connectors, the inner body securing the electrical connectors;
placing a strain relief around the electrical power cord, the strain relief having plurality of protrusions extending radially away from the electrical power cord;
producing an injection mold comprising a top mold block, a bottom mold block, and a socket mold block, the injection mold having a mold cavity shaped to correspond to the desired shape of the overmolded electric plug with integrated strain relief, the bottom mold block shaped to receive and detachably secure the inner body assembly and a strain relief, the socket mold block having socket connectors configured to receive the electrical connectors, the injection mold having a feeder injection port;
coupling the electrical connectors to the socket connectors of the socket mold block placing the inner body assembly and the strain relief into the bottom mold;
pressing the top mold block onto the bottom mold block;
injecting a molten insulating material into the injection mold through the feeder injection port; and,
removing the overmolded electric plug from the injection mold,
wherein:
the protrusions of the strain relief are contoured having a first and a second beveled surface forming a ridge distal to the electrical power cord, and
the mold cavity is shaped to receive the protrusions of the strain relief and form a contact with the first and the second beveled surfaces, wherein when the top mold block is pressed toward the second mold block, the section of the mold cavity mold cavity adjacent to the first and second beveled surfaces urge the strain relief to move along the electrical power cord to a desired angular orientation.

19. A method for manufacturing an overmolded electric plug with integrated strain relief, comprising:
producing an inner body assembly comprising a wire assembly and an inner body, the wire assembly comprising an electrical power cord and electrical connectors, the inner body securing the electrical connectors;
placing a strain relief around the electrical power cord, the strain relief having plurality of protrusions extending radially away from the electrical power cord;
producing an injection mold comprising a top mold block, a bottom mold block, and a socket mold block, the injection mold having a mold cavity shaped to correspond to the desired shape of the overmolded electric plug with integrated strain relief, the bottom mold block shaped to receive and detachably secure the inner body assembly and a strain relief, the socket mold block having socket connectors configured to receive the electrical connectors, the injection mold having a feeder injection port;
coupling the electrical connectors to the socket connectors of the socket mold block placing the inner body assembly and the strain relief into the bottom mold;
pressing the top mold block onto the bottom mold block;
injecting a molten insulating material into the injection mold through the feeder injection port; and,
removing the overmolded electric plug from the injection mold,
wherein:
the inner body assembly further comprises one or more inner body protrusions projecting outward and away from the top of the inner body assembly; and,
the upper mold block is shaped to receive the inner body protrusions and form a seal surrounding the inner body protrusions to prevent the molten material from depositing on the top surface of the inner body protrusions.

* * * * *